US010009365B2

(12) United States Patent
Jain et al.

(10) Patent No.: US 10,009,365 B2
(45) Date of Patent: Jun. 26, 2018

(54) SYSTEM AND METHOD FOR INTEGRATED HEADER, STATE, RATE AND CONTENT ANOMALY PREVENTION FOR SESSION INITIATION PROTOCOL

(71) Applicant: Fortinet, Inc., Sunnyvale, CA (US)

(72) Inventors: Hemant Kumar Jain, Milpitas, CA (US); Venkata Yallapragada, Cupertino, CA (US); Bhavin Shah, Hyderabad (IN); Radhika Palepu, Hyderabad (IN)

(73) Assignee: Fortinet, Inc., Sunnyvale, CA (US)

( * ) Notice: Subject to any disclaimer, the term of this patent is extended or adjusted under 35 U.S.C. 154(b) by 0 days. days.

(21) Appl. No.: 15/604,299

(22) Filed: May 24, 2017

(65) Prior Publication Data

US 2017/0257348 A1   Sep. 7, 2017

Related U.S. Application Data

(63) Continuation of application No. 13/849,485, filed on Mar. 23, 2013, now Pat. No. 9,729,509.

(51) Int. Cl.
*H04L 29/06* (2006.01)

(52) U.S. Cl.
CPC ...... *H04L 63/1425* (2013.01); *H04L 63/0227* (2013.01); *H04L 63/0236* (2013.01); *H04L 63/0245* (2013.01); *H04L 63/0254* (2013.01); *H04L 63/14* (2013.01); *H04L 63/1408* (2013.01); *H04L 63/1416* (2013.01); *H04L 63/1441* (2013.01); *H04L 63/1458* (2013.01); *H04L 63/162* (2013.01); *H04L 63/164* (2013.01); *H04L 63/166* (2013.01);
(Continued)

(58) Field of Classification Search
CPC ............ H04L 63/1416; H04L 63/0245; H04L 2463/142; H04L 63/0227; H04L 63/0236; H04L 63/0254; H04L 63/14; H04L 63/1408; H04L 63/1425; H04L 63/1441; H04L 63/1458; H04L 63/162; H04L 63/164; H04L 63/166; H04L 63/168; H04L 65/10; H04L 65/1006
See application file for complete search history.

(56) References Cited

U.S. PATENT DOCUMENTS

2006/0146816 A1   7/2006   Jain
2007/0121596 A1*  5/2007   Kurapati ........... H04L 29/06027
                                                    370/356
(Continued)

*Primary Examiner* — Theodore C Parsons
(74) *Attorney, Agent, or Firm* — Hamilton, DeSanctis & Cha LLP

(57) ABSTRACT

Methods and systems for an integrated solution to the rate based denial of service attacks targeting the Session Initiation Protocol are provided. According to one embodiment, header, state, rate and content anomalies are prevented and network policy enforcement is provided for session initiation protocol (SIP). A hardware-based apparatus helps identify SIP rate-thresholds through continuous and adaptive learning. The apparatus can determine SIP header and SIP state anomalies and drop packets containing those anomalies. SIP requests and responses are inspected for known malicious contents using a Content Inspection Engine. The apparatus integrates advantageous solutions to prevent anomalous packets and enables a policy based packet filter for SIP.

10 Claims, 20 Drawing Sheets

(52) U.S. Cl.
    CPC ........ *H04L 63/168* (2013.01); *H04L 65/1006* (2013.01); *H04L 2463/142* (2013.01)

(56) References Cited

U.S. PATENT DOCUMENTS

| | | |
|---|---|---|
| 2008/0127349 A1* | 5/2008 | Ormazabal ......... H04L 63/1458 726/25 |
| 2008/0262990 A1 | 10/2008 | Kappor et al. |
| 2009/0007220 A1 | 1/2009 | Ormazabal et al. |
| 2010/0071024 A1 | 3/2010 | Eyada |
| 2011/0238855 A1 | 9/2011 | Korsunsky et al. |
| 2012/0174217 A1* | 7/2012 | Ormazabal ......... H04L 63/1458 726/22 |
| 2014/0289840 A1 | 9/2014 | Jain et al. |

\* cited by examiner

SYSTEM AND METHOD FOR INTEGRATED HEADER, STATE, RATE AND CONTENT ANOMALY PREVENTION FOR SESSION INITIATION PROTOCOL

CROSS-REFERENCE TO RELATED PATENTS

This application is a continuation of U.S. patent application Ser. No. 13/849,485, filed Mar. 23, 2013, now U.S. Pat. No. 9,729,509, which is hereby incorporated by reference in its entirety for all purposes.

This application also relates to U.S. Pat. No. 7,426,634 entitled, "Method and apparatus for rate based denial of service attack detection and prevention", U.S. Pat. No. 7,602,731 entitled "System and method for integrated header, state, rate and content anomaly prevention with policy enforcement", and U.S. Pat. No. 7,626,940 entitled "System and method for integrated header, state, rate and content anomaly prevention for domain name service" all of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright 2013-2017, Fortinet, Inc.

FIELD

Embodiments of the present invention relate generally to intrusion prevention and more particular to a system and method for the prevention of denial of service (DoS) attacks on voice over IP protocols, such as Session Initiation Protocol (SIP).

DESCRIPTION OF THE BACKGROUND ART

Distributed Dos (DDoS) attack mitigation appliances have been in use due to increasing distributed denial of attacks on various services. These services include HTTP, DNS, among others. Voice over IP usage has been growing exponentially As one skilled in the art knows, Internet attacks have been growing in complexity and have been more wide-spread due to a variety of readily available attack toolkits. Many of the recent DoS and DDoS attacks have been on SIP servers. By overloading the SIP servers, the attackers can easily deny access to the associated web-service or other related Internet services. Clearly, a new method and system is needed to protect SIP servers from getting flooded with unwanted and illegitimate requests.

SUMMARY

Methods and systems are described for an integrated solution to the rate based denial of service attacks targeting the Session Initiation Protocol. According to one embodiment, header, state, rate and content anomalies are prevented and network policy enforcement is provided for session initiation protocol (SIP). A hardware-based apparatus helps identify SIP rate-thresholds through continuous and adaptive learning. The apparatus can determine SIP header and SIP state anomalies and drop packets containing those anomalies. SIP requests and responses are inspected for known malicious contents using a Content Inspection Engine. The apparatus integrates advantageous solutions to prevent anomalous packets and enables a policy based packet filter for SIP.

Other features of embodiments of the present disclosure will be apparent from accompanying drawings and from detailed description that follows.

BRIEF DESCRIPTION OF THE DRAWINGS

FIG. 10 illustrates parts of logic for processing of SIP other request during normal and rate-flood situations in accordance with an embodiment of the present invention.

DETAILED DESCRIPTION

Figure 1:
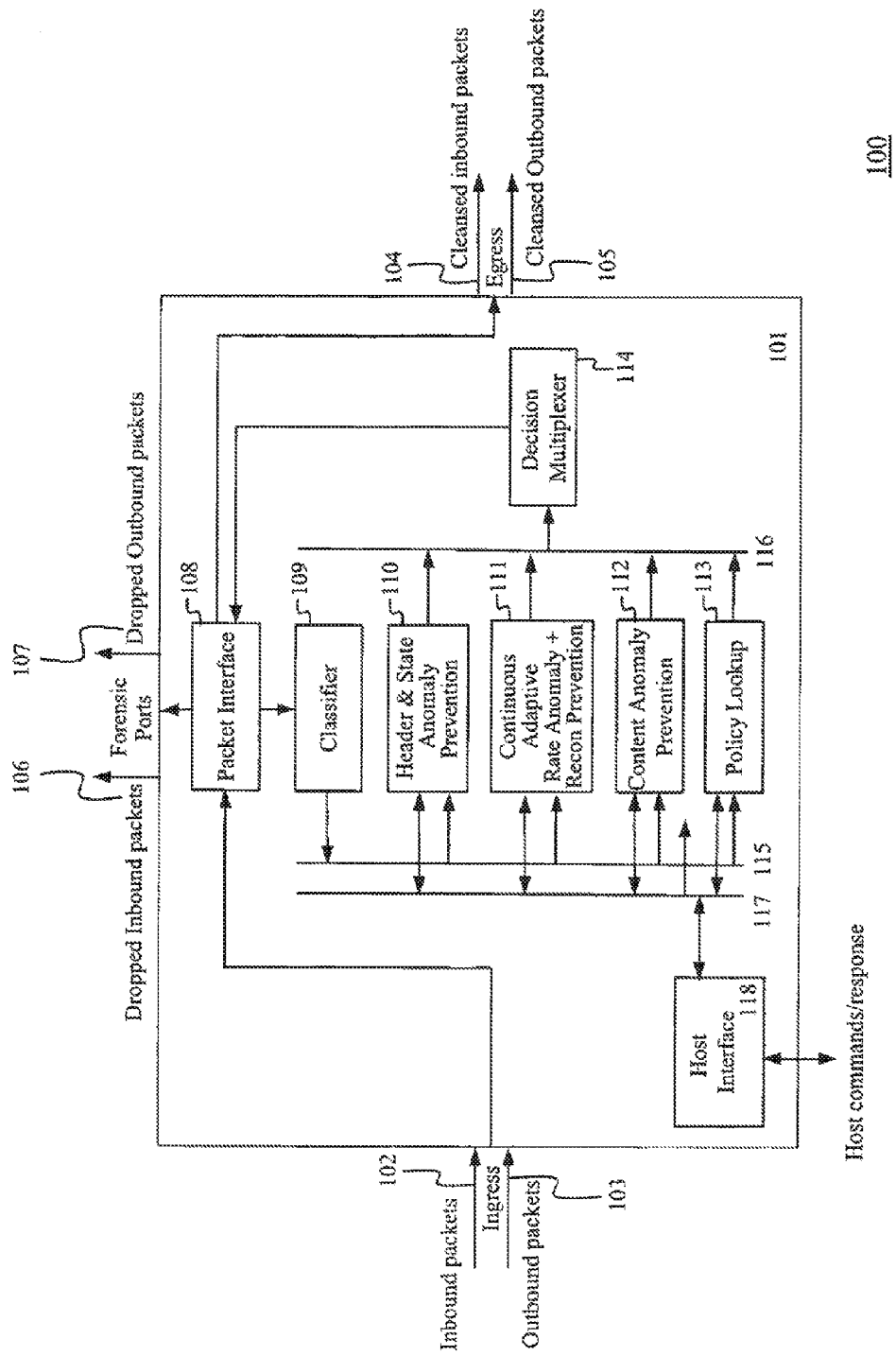
FIG. 1 illustrates an exemplary apparatus embodying the present invention.

Methods and systems are described for an integrated solution to the rate based denial of service attacks targeting the Session Initiation Protocol (SIP). Embodiments of the present invention provide an integrated intrusion prevention solution for SIP related attacks. In one embodiment, a single hardware based appliance integrates a plurality of mechanisms to prevent different anomalies and enables a policy based packet filter.

Current trends in attack on SIP protocol relate to pre-attack probes, header anomalies, state anomalies, rate anomalies and content anomalies.

Embodiments of the present invention provide an appliance that integrates solutions to these different anomalies and provides an integrated solution to the rate based denial of service attacks, especially on the Session Initiation Protocol.

The new appliance described herein provides copper and optical connectivity. A Packet Interface block interfaces with external network through a PHY and a MAC device and buffers packets until a decision has been made about them.

A Packet Classifier interfaces with Packet interface to classifier. The Rate Anomaly Meters receive classifier output and maintain the instantaneous packet-rates and compare against the thresholds set adaptively and continuously by the controlling host.

If the specific type of packets exceeds the rate threshold, packets of that type or belonging to that group are discarded for a certain time period.

The anomaly engines drop packets that have header or state anomalies in different layers of protocol.

A fragment reassembly engine reassembles any fragments according to processes well-known in the art. Assembled or un-fragmented packets are then sent to an engine that removes any reordering issues or retransmission anomalies for TCP packets.

Ordered TCP as well as non-TCP packets are then sent to relevant protocol normalization engines. The derived layers 2, 3, 4 and 7 header-parameters and state information are then used by the Multi-rule search engine to find a rule-set that matches the incoming packet.

A rule-matching engine drives the content inspection engine to validate if contents of the packet match any of the anomalous signatures. A Stateful sub-rule traversal engine then validates if further contents of the packet meet sub-signatures of the rule.

If a rule match is found, it is added to the event queue corresponding to the packet. A packet may match multiple rules.

After all the rules matches have been performed, a decision multiplexer picks the highest priority rule match and informs the MAC interface whether to let the packet through or to drop the packet. Allowed packets are then sent out.

An object of various embodiments of the present invention is to provide a high-rate hardware based integrated system and method of preventing network packets across, the packets having layers 2, 3, 4, and 7 header anomalies and, more specifically, SIP header anomalies;

layers 2, 3, 4, and 7 state transition and state based anomalies and, more specifically, SIP state transition anomalies;

layers 2, 3, 4, and 7 rate anomalies as detected by the system, which is continuously and adaptively adjusting rate thresholds and, more specifically, SIP rate anomalies;

characteristics of network probes or reconnaissance as detected by certain meters;

content anomalies as defined by a set of content rules; or violation of network policies, as set by a system administrator.

Another object of various embodiments of the present invention is to provide a SIP classifier that is capable of classifying TCP and UDP based SIP packets and components of SIP protocol headers.

Still further object of various embodiments of the present invention is to provide a SIP Rate Anomaly Engine capable of continuously calculating the traffic rate on classified SIP parameters and estimating the traffic rate thresholds adaptively and thus determining the threshold violations on Session Initiation Protocol parameters such as register, invite etc.

Yet another object of various embodiments of the present invention is to provide a SIP State Anomaly Engine that can validate SIP requests and responses and that can drop them if there is no previous corresponding register operation associated with them.

Still another object of various embodiments is to provide a method to determine any known content patterns of intrusion in session initiation protocol packets.

Still another object of various embodiments is to provide a method to determine any known policy violations on session initiation protocol service.

FIG. 1 depicts an exemplary apparatus 101 illustrating the functionality of an integrated system 100 for the prevention of network attacks in accordance with an embodiment of the present invention. The four main attack prevention components are the Header and State Anomaly Prevention 110, the Continuous Adaptive Rate Anomaly and Reconnaissance Prevention 111, the Content Anomaly Prevention 112, and the Policy Lookup Engine 113.

Inbound packets 102 enter the apparatus 101 and exit as cleansed inbound packets 104. Similarly, outbound packets 103 enter the apparatus 101 and exit as cleansed outbound packets 105. The dropped packets make the difference between packets at ingress and at egress. For the purpose of forensic analysis, these dropped packets are routed to two forensic ports viz. the Dropped Inbound Packets 106, and the Dropped Outbound Packets 107.

Packets entering the system 100 are buffered in the Packet Interface block 108. A copy of these packets is passed to the Classifier 109 which passes on the header and other relevant information over the Classification bus 115 to the subsequent blocks for decision making. The Packet Interface block 108 receives a multiplexed decision about each packet buffered within and either allows the packets or drops the packets. The drop packets are optionally copied to the forensic ports 106 and 107.

The decision making operation of determining which packets need to be dropped is handled by the four major blocks, viz. the Header and State Anomaly Prevention 110, the Rate Anomaly and Reconnaissance Prevention 111, the Content Anomaly Prevention 112, and the Policy Lookup Engine 113. They send the results to the Decision Multiplexer 114 via the Decision bus 116.

A controlling host such as a management CPU uses the Host Interface 118 to read the controlling parameters and set the parameters of different blocks via the Host Interface Bus 117. The controlling host also periodically reads the granular traffic rates and uses it to estimate threshold for rate parameters. The controlling host also reads events related to policy violations and anomalies. In some embodiments, these events are subsequently logged and/or analyzed.

The Header Anomaly Prevention block within 110 prevents packets that have layers 2, 3, 4 and 7 header anomalies according to protocols under consideration. For example, in an exemplary embodiment of this invention, layer 3 header anomaly prevention looks for packets that are marked IPV4 packets in layer 2 header but do not have version 4 in the IP header. Similarly, besides other anomalies, layer 4 header anomaly prevention block looks for TCP packets that have illegal flag combinations such as SYN and FIN set together. In an exemplary embodiment of this invention, the layer 7 header anomaly prevention block additionally looks for anomalous behavior such as non-SIP traffic destined for TCP or UDP ports 5060.

The State Anomaly Prevention block within 110 prevents packets that violate standard state transitions in protocols. In an exemplary embodiment of this invention, the layer 4 state anomaly prevention block prevents packets that do not belong to any established connection and have ACK bit on in the TCP flags. In an exemplary embodiment of this invention, the layer 7 state anomaly prevention block can additionally prevent SIP Cancel requests that are arriving without the corresponding SIP registration or invite or if the CSeq number is incorrect.

The Continuous and Adaptive Rate Anomaly Prevention block within 112 prevents instantaneous rate anomaly as detected through continuous and adaptive learning. In an exemplary embodiment of this invention, rate anomalies at network layers 2, 3, 4 and 7 are to be detected and prevented by this block. In an exemplary embodiment of this invention, SIP Request rate anomaly is prevented by detecting SIP Invite, Register and other request packets exceeding their adaptively learnt threshold in a given direction.

The Reconnaissance Prevention block within 112 prevents reconnaissance (recon) activities. In an exemplary embodiment of this invention, as an example, one of the recon prevention schemes is implemented utilizing a port-scan counter.

The Content Anomaly Prevention block 112 prevents packets that match known signature of attacks in the application content of the packet. In an exemplary embodiment of this invention, these rules consist of signatures in the packet anywhere or within specifically parsed areas of the packets such as a SIP protocol payload. These signatures can be added by the administrator based on a packet dump of incoming attack packets if they see a repetitive pattern among them.

The Policy Lookup engine 113 prevents packets that violate the network policies set by an administrator. In an exemplary embodiment, the policies are set by the administrator and include rules that allow or deny packets based on interface, source IP address, destination IP address, IPV4 or IPV6 protocol, source port, destination port, and/or ICMP type and code. In an exemplary embodiment, for SIP protocols, policies are available for a user to allow or deny packets with specific SIP parameters such as requests, responses, or specific values of CALL-ID, From tag, To tag, To-URI, CSeq and User-agent header etc.

The Decision Multiplexer block 114 receives decisions from decision making blocks 110, 111, 112, and 113 over the Decision bus 116, combines them as a single decision, and forwards them to the Packet Interface block 108.

The controlling host can read the control registers and set them to manage the functionality of different components. The controlling host can periodically read the maximum packet rates of different types of packets to come up with an adaptive threshold and program them using the Host Interface Block 118. The Host Interface Block 118 accesses other blocks through the Host Interface Bus 117. The controlling host can also read the statistics related to packets being dropped due to anomalies or policy violation. The controlling host can then use this data for logging and analysis. In an exemplary embodiment, the controlling host can read the maximum packet rates for SIP Request packets or response packets in two directions and set the adaptive thresholds for them through the Host Interface Block 118.

Figure 2:
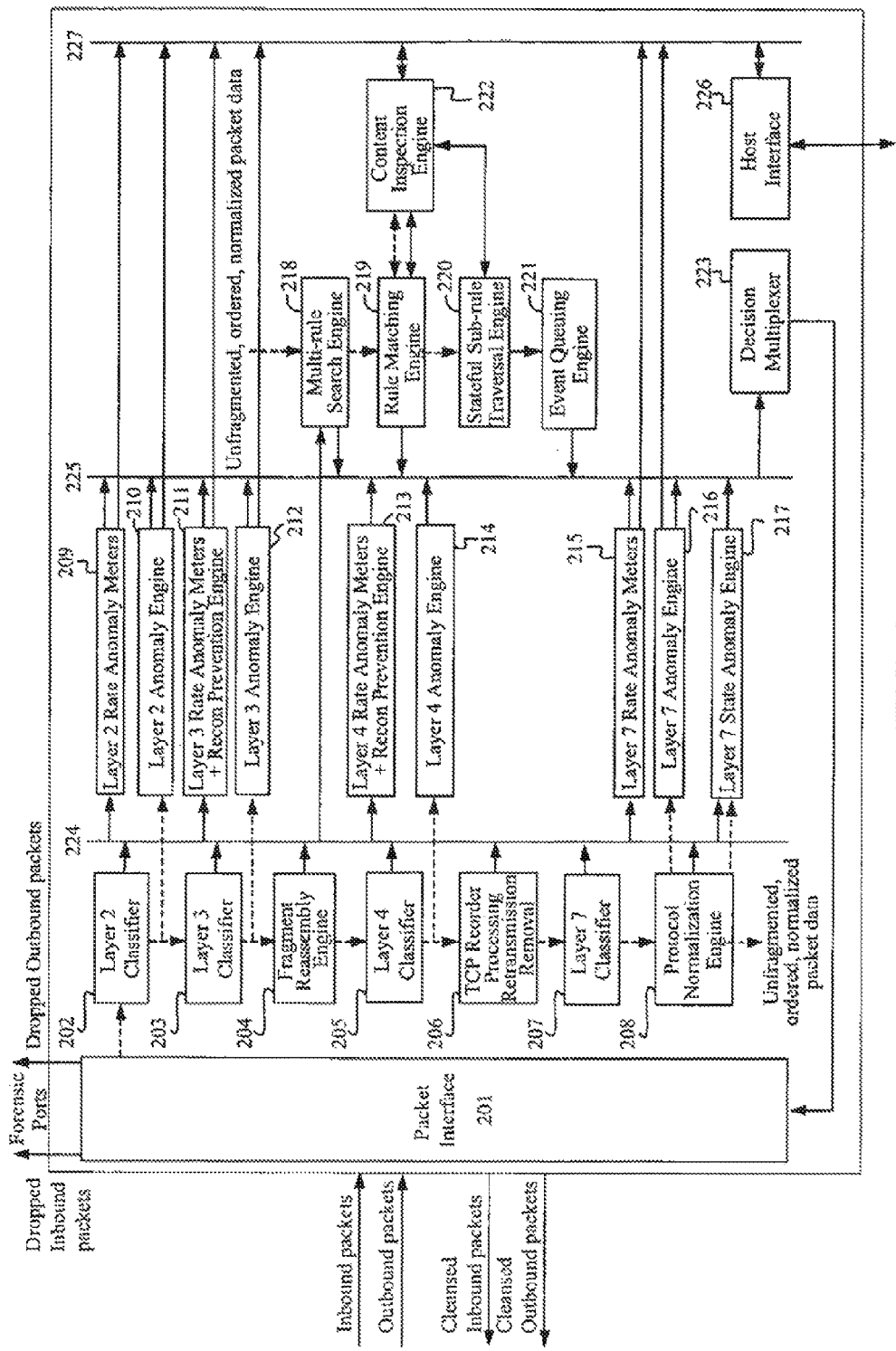
FIG. 2 schematically shows architectural details of FIG. 1, depicting some of the key components necessary to implement a system according to the present invention.

FIG. 2 illustrates further details of the system 100 from FIG. 1 in accordance with an embodiment of the present invention. Packet Interface 201 receives packets, buffers them, releases a copy of the packets to the subsequent logic, re-releases another copy of the packets held upon order from certain blocks, awaits decisions and subsequently either transmits them further or drops and/or transmits them on forensic ports.

The Classifier 109 is further illustrated in detail through the Layer 2 Classifier 202, the Layer 3 Classifier 203, the Fragment Reassembly Engine 204, the TCP Reorder Processing and the Layer 4 Classifier 205, Retransmission Removal Engine 206, the Layer 7 Classifier 207, and the Protocol Normalization Engine 208.

The Layer 2 Classifier 202 receives frames from Packet Interface 201 and classifies packets based on their layer 2 characteristics. It parses the layer 2 headers and passes that information to subsequent logic blocks over the Classification Bus 224. In an exemplary embodiment of this invention, this block can parse Ethernet frames and IEEE 802.2/3 frames and can determine ARP, RARP, Broadcast, Multicast, non-IP, VLAN tagged frames, and double encapsulated VLAN tagged frames.

The Layer 3 Classifier 203 receives packet data as well as layer 2 classifier information from the Layer 2 Classifier 202. It extracts the layer 3 header information in IPV4 and IPV6 headers and passes it on to the subsequent logic over the Classification Bus 224. In some embodiments of this invention, the Classifier parses IPV4 and IPV6 packets and determines properties such as TOS, IP Options, fragmentation, and protocol.

The Fragment Reassembly Engine 204 receives layer 3 header information from the Layer 3 Classifier 203 as well as the packet data. In cases where the Layer 3 Classifier 203 informs that this packet is a fragmented packet, the Fragment Reassembly Engine 204 requests the Packet Interface 201 to hold the packet. It also informs subsequent blocks not to inspect especially tagged fragmented packets, as they are not yet assembled. It stores the information about fragments in its internal data-structures related to reassembly. Packets that are not fragmented are passed through. A timeout based mechanism is then used to wait until all the fragments that belong together have been received. An ager based mechanism periodically wakes up and determines whether some fragments are over-age and discards them from memory.

Once the Fragment Reassembly Engine 204 determines that all fragments corresponding to one datagram are in-order and do not violate any fragmentation related anomalies, it requests the Packet Interface 201 to re-release them in-order. These packets are then passed through the subsequent blocks in order for further inspection. The Fragment Reassembly Engine 204 therefore guarantees that blocks subsequent to it always receive datagram fragments in-order.

The Fragment Reassembly Engine 204 also determines whether there are fragmentation related anomalies and, if so, marks those packets as invalid and informs the decision to the Decision Multiplexer 223 over the Decision Bus 225. The techniques necessary to achieve fragment assembly as well as fragmentation related anomaly prevention are well known to those skilled in the art and thus are not further described herein. The allowed assembled packets leave as original unmodified packets with their own packet ID, but they leave the Fragment Reassembly Engine 204 in order so that subsequent blocks can inspect the content in order.

The Layer 4 Classifier 205, similarly, parses the layer 4 information from packets that are guaranteed to be in order with respect to fragmentation. In an exemplary embodiment, this classifier looks at TCP, UDP, ICMP, IPSec-ESP, and IPSec-AH headers. This information is passed to the subsequent blocks over the Classification Bus 224. In an exemplary embodiment of this invention, this classifier can parse layer 4 information such as TCP Options, TCP ports, UDP Ports, ICMP types/codes, TCP flags, sequence numbers, ACK numbers etc. Packets that are anomalous are dropped.

The TCP Reordering Processing and Retransmission Removal Engine 206 receives classified packets from the Layer 4 Classifier 205. It only monitors TCP packets and it passes the rest further to subsequent blocks for further inspection. It creates connection states in memory tables and ensures that packets follow well-known TCP state transitions. Packets that are anomalous are dropped through a decision sent over the Decision Bus 225 to the Decision Multiplexer 223. Preferably, this block further checks whether the packet's TCP sequence number is in order and within the receiver's window. Packets that are outside the window are dropped through the Decision Multiplexer 223. Packets that are in-order and not retransmissions are passed through.

For all packets within the window that have not been acknowledged yet, a CRC based checksum is saved as part of the state for the connection. It requests subsequent blocks not to inspect the packets which are out of order. It holds data structure related to such packets in memory. For every such packet stored in memory, a self-generated ACK is sent to the sender to facilitate quicker reordering. A timeout based mechanism is then used to wait until expected sequence number arrives for the connection. An ager based mechanism periodically wakes up and determines whether some packets are over-age and discards them from memory. The ordered packets are then passed through the subsequent blocks in order for further inspection. This way, the subsequent blocks can always assume that TCP packets will always be in-order.

The TCP Reordering Processing and Retransmission Removal Engine 206 also determines whether there are retransmission related anomalies and, if so, marks those packets as invalid and informs the decision to the Decision Multiplexer 223 over the Decision Bus 225. Retransmission anomalies are determined using the stored CRC based checksum. Retransmitted packets that are equal or larger than the previous transmission can be determined to be anomalous through a CRC comparison. Retransmissions that are smaller than earlier transmission are discarded. The techniques necessary to achieve TCP reordering as well as retransmission related anomaly prevention are well known to those skilled in the art and thus are not further described herein. The allowed ordered packets leave as original unmodified packets with their own packet ID, but they leave the engine 206 in order so that subsequent blocks can inspect the content in order.

The Layer 7 Classifier 207 receives ordered fragments of IP datagrams, ordered TCP packets, specially flagged TCP retransmissions and other packets, and parses layer 7 header information. In an exemplary embodiment of this invention, this block parses headers of protocols such as FTP, HTTP, TELNET, DNS, SIP, SMTP, POP, RPC, etc. It does so using stateful parsing techniques well-known to those aware of the art.

In an embodiment of this invention, the FTP classifier within 207 determines the commands and replies being used in the FTP packets. Commands parsed include USER, PASS, ACCT, CWD, CDUP, SMNT, REIN, QUIT, PORT, PASV, TYPE, STRU, MODE, RETR, STOR, STOU, APPE, ALLO, REST, RNFR, RNTO, ABOR, DELE, RMD, MKD, PWD, LIST, NLST, SITE, SYST, STAT, HELP, NOOP. 3-digit reply codes are parsed as well and grouped as positive and negative.

In an embodiment of this invention, the HTTP classifier within 207 determines the requests and replies being used in the HTTP packets. Requests are parsed as Method, Request-URI, Request-Header Fields, and HTTP-Version. The Method is further classified as OPTIONS, GET, HEAD, POST, PUT, DELETE, TRACE, CONNECT, and extension methods. The request URI is isolated and passed further. Request-Header Fields such as Accept-Charset, Accept-Encoding, Accept-Language, Authorization, Expect, From, Host, If-Match, If-Modified-Since, If-None-Match, If-Range, If-Unmodified-Since, Max-Forwards, Proxy-Authorization, Range, Referer, TE, User-Agent. 3-digit status codes are parsed as well and grouped as positive and negative.

In an embodiment of this invention, the TELNET classifier within 207 determines the telnet commands. The commands classified are SE, NOP, Data Mark, Break, Interrupt Process, Abort Output, Are you there, Erase character, Erase line, Go ahead, SB, WILL, Won't, Do, Don't and IAC.

In an embodiment of this invention, the TELNET classifier within 207 determines the telnet commands. The commands classified are SE, NOP, Data Mark, Break, Interrupt Process, Abort Output, Are you there, Erase character, Erase line, Go ahead, SB, WILL, Won't, Do, Don't and IAC.

In an embodiment of this invention, the DNS classifier within 207 parses the DNS queries. The parser breaks the DNS message into Header, Question, Answer, Authority, and Additional sections. The header is further parsed to determine whether the message is a query, response or some other code. The Question section is further parsed as QNAME, QTYPE and QCLASS. The Answer section is further classified as resource record (RR) consisting of Domain Name, Type, Class, TTL, and Resource data length.

In an embodiment of this invention, the SIP classifier within 207 determines the requests and responses being used in the SIP packets. Requests are parsed as Method and Request-URI. The Method is further classified as REGIS- TER, INVITE, ACK, CANCEL, BYE, OPTION AND PRACK. Request-Header Fields, such as CALL-ID, To, From, To-URI, CSeq and User-agent header, are parsed as well. Responses are further decoded as positive and negative.

In an embodiment of this invention, the SMTP classifier within 207 parses the SMTP commands and replies. The commands are further parsed as EHLO, HELO, MAIL, RCPT, DATA, RSET, VRFY, EXPN, HELP, NOOP, and QUIT. Replies are further decoded as positive and negative.

In an embodiment of this invention, the POP classifier within 207 parses the POP commands and responses. The commands are further parsed as USER, PASS, APOP, QUIT, STAT, LIST, RETR, DELE, NOOP, RSET, TOP, UIDL, and QUIT. Responses are further decoded as positive and negative.

In an embodiment of this invention, the RPC classifier within 207 parses the RPC message. The message is parsed as transaction id, followed by the call or reply. The call is further parsed as RPC version, program number, version number, procedure and the rest of the call body. The reply is further parsed as accepted or denied.

Layer 7 State Anomaly Engine 217 takes classified data from the SIP Classifier 207 and maintains stateful transitions.

Protocol Normalization Engine 208 receives classified packets and normalizes the parsed data so that it can be inspected for content anomalies. In a preferred embodiment of the invention, the normalization is done for URI portion of the within HTTP. The normalizations include Hex-encoding, Double Percent Hex-encoding, Double Nibble Hex Encoding, First Nibble Hex Encoding, Second Nibble Hex Encoding, UTF-8 Encoding, UTF-8 Bare Byte Encoding, Unicode, Microsoft % U encoding, Alt-Unicode, Double encode, IIS Flip Slash, White-space, etc. In a preferred embodiment of this invention the normalization is done for RPC records by consolidating records broken into more than one record fragment into a single record fragment. In a preferred embodiment of this invention, the TELNET protocol normalization removes negotiation sequences. This normalization prunes negotiation code by copying all non-negotiation data from the packet. In a preferred embodiment of this invention, the TELNET normalization is also performed on the FTP packets.

The Continuous and Adaptive Rate Anomaly block within 111 is further illustrated in the Layer 2 Rate Anomaly Meters 209, the Layer 3 Rate Anomaly Meters 211, the Layer 4 Rate Anomaly Meters 213, and the Layer 7 Rate Anomaly Meters 215. The meters 209, 211, and 213 continuously and adaptively determine rate thresholds for layers 2, 3 and 4 network parameters and determine whether flood is occurring for any of the parameters. A controlling host uses the Host Interface 226 to learn the rate and set the threshold. All the meters support a two-way communication with the host through the Host Interface Bus 227. The above referenced co-pending U.S. patent application Ser. No. 10/759,799, entitled "METHOD AND APPARATUS FOR RATE BASED DENIAL OF SERVICE ATTACK DETECTION AND PREVENTION," discusses in detail how rate based denial of service attacks can be prevented using a continuous and adaptive learning approach for layers 2, 3 and 4 based attacks.

The Layer 7 Rate Anomaly Meters 215 continuously and adaptively determine rate thresholds for layer 7 network parameters and determine whether flood is occurring for any of the parameters. In an exemplary embodiment, the apparatus can detect and prevent application layer floods such as HTTP Request Type Floods, HTTP Failure Floods, FTP Request Floods, FTP Failure Floods, DNS Query Floods, DNS Response Floods, SIP Floods.

According to one embodiment of the present invention, a SIP Request Rate Anomaly Meter prevents SIP request transactions from being used more often than the previously observed threshold. The Host Interface Bus 227 is used to inform the controlling host, via the Host Interface 226, of the continuous rates being learnt so that the controlling host can adaptively set the thresholds for layer 7 Rate Anomaly Meters 215.

The Recon Prevention sub-block within 111 is further illustrated in the Layer 3 Recon Prevention sub-block within 211 and the Layer 4 Recon Prevention sub-block within 213. The Layer 3 Recon Prevention sub-block within 211 prevents reconnaissance activity at layer 3. In an exemplary embodiment of this invention, this block prevents IP-address scanning, using information received from the layer 3 classifier and determines whether a single source is connecting to many IP addresses within a short interval. In another embodiment of this invention, this block prevents dark-address scanning, using information received from the layer 3 classifier and determines whether a source is scanning unused IP address ranges.

The Layer 4 Recon Prevention sub-block within 213 prevents reconnaissance activity at layer 4. In an exemplary embodiment of this invention, this block prevents port-scanning, using information received from the layer 3 and layer 4 classifiers and determines whether a single source is connecting to many layer 4 TCP/UDP ports within a short interval The Header and State Anomaly Prevention block within 110 is further illustrated in the Layer 2 Anomaly Engine 210, the Layer 3 Anomaly Engine 212, the Layer 4 Anomaly Engine 214, and the Layer 7 Anomaly Engine 216. The Engines 210, 212, 214 and 216 receive corresponding classifier outputs over the Classification Bus 224 and determine whether the header has any anomaly or whether the state transition due to header values leads to anomalies. The packets determined to be anomalous are dropped via a decision sent over the Decision Bus 225 to the Decision Multiplexer 223.

The Layer 3 and Layer 4 Anomaly Engine 212 and 214 detect and prevent IPV4 packets that have one or more of the following anomalies:
  invalid IP header checksum,
  version other than 4,
  source or destination equivalent to local host,
  same source and destination,
  end of packet before 20 bytes,
  end of packets before the length specified by total length,
  end of packet while parsing options,
  option length less than 3,
  time to live is 0,
  protocol corresponding to ipv6, etc.

In some embodiments, the Layer 3 Anomaly Engine 212 detects and prevents IPV6 packets that have one or more of the following anomalies:
  version other than 6,
  source or destination equivalent to local host,
  same source and destination,
  end of packet before the header,
  end of packet in the middle of the headers,
  end of packet while parsing options,
  same extension header occurring more than once,
  hop-limit of 0,
  Protocol corresponding to ipv4, etc.

In some embodiments, the Layer 3 Anomaly Engine 212 also prevents fragmented packets that have over assembly related anomalies as detected by Fragment Assembly Engine 204.

In some embodiments, the Layer 4 Anomaly Engine 214, detects and prevents TCP packets that have one or more of the following anomalies:
- data offset less than 5,
- TCP checksum error,
- illegal TCP flag combinations,
- urgent flag set, but urgent pointer is zero,
- end of packet before 20 bytes of TCP header,
- length field in window scale option is other than 3,
- TCP Option length is less than 2, etc.

In some embodiments, the Layer 4 State Anomaly Engine 214, detects and prevents UDP packets that have one or more of the following anomalies:
- optional UDP checksum error,
- end of packet before 8 bytes of UDP header, etc.

In some embodiments, the Layer 4 State Anomaly Engine 214 detects and prevents TCP packets that violate valid state transitions that are expected by standard TCP state machines. For this purpose, it receives information from the Layer 4 Classifier 205 and the TCP Reorder Processing and Retransmission Removal Engine 206. Packets that are outside the receiver's window as maintained by the state table are also dropped for being anomalous. Retransmitted packets that are determined by the Retransmission Removal engine 206 to be different from the original transmission are also dropped by the Layer 4 State Anomaly Engine 214.

In some embodiments, the Layer 7 Anomaly Engine 216 prevents state transition anomalies at layer 7 protocols such as HTTP, e.g., the GET keyword for request method must be followed by a URI. Similarly, the FTP protocol Anomaly Engine within 216 can identify requests that are within the allowed requests as defined in the RFC. In an exemplary embodiment of this invention, the SIP anomaly engine can prevent a SIP BYE without an associated SIP REGISTER.

The Content Anomaly Prevention block 112 is further illustrated via its sub-components Multi-Rule Search Engine 218, Rule Matching Engine 219, Stateful Sub-rule Traversal Engine 220, Event Queuing Engine 221, and Content Inspection Engine 222, the Classification Bus 224. Part of this information, viz. Interface, Source IP Address, Destination IP Address, Protocol, Source Port, and Destination Port, is used to first search through a search engine to determine whether the packet violates any policies. If so, the packet is dropped through a decision conveyed over, the Decision Bus 225 and the Decision Multiplexer 223.

If the search matches certain rules and requires further content inspection, the Rule Matching Engine 219 sends the assembled, ordered, normalized data to the Content Inspection Engine 222. An external host loads the contents of the BRAM, SRAM, and DRAM of the Content Inspection Engine 222 with necessary signatures corresponding to the rule-sets through the Host Interface 226 over the Host Interface Bus 227.

The Content Inspection Engine 222 can start the initial state at a specific point where the last match for the previous packet had occurred. This helps in statefully matching the strings across packets.

Once the Rule Matching Engine 219 determines, via the Content Inspection Engine 222, that the packet matches at least one of the signatures, it needs to statefully walk through all the optional sub-signatures within the rule. The statefulness is required because the signatures may be split across fragmented packets or reordered packets. For this purpose, the state of the last match where it was left is kept in the memory for the specific connection.

Once all signatures are found to be present in the packet, the rule is said to be matched. Such a match is denoted as an event. This event is queued against the packet's ID in the Event Queuing Engine 221.

A packet may match multiple such events. A priority scheme within the Event Queuing Engine 221 picks the highest priority event from the determined events for the packet and informs the corresponding decision to the Decision Multiplexer 223 over the Decision Bus 225.

Blocks such as 209, 210, 211, 212, 213, 214, 215, 216, 218, 219, and 221 inform of their decision, whether to drop the packet or not, to the Decision Multiplexer 223.

Figure 3:
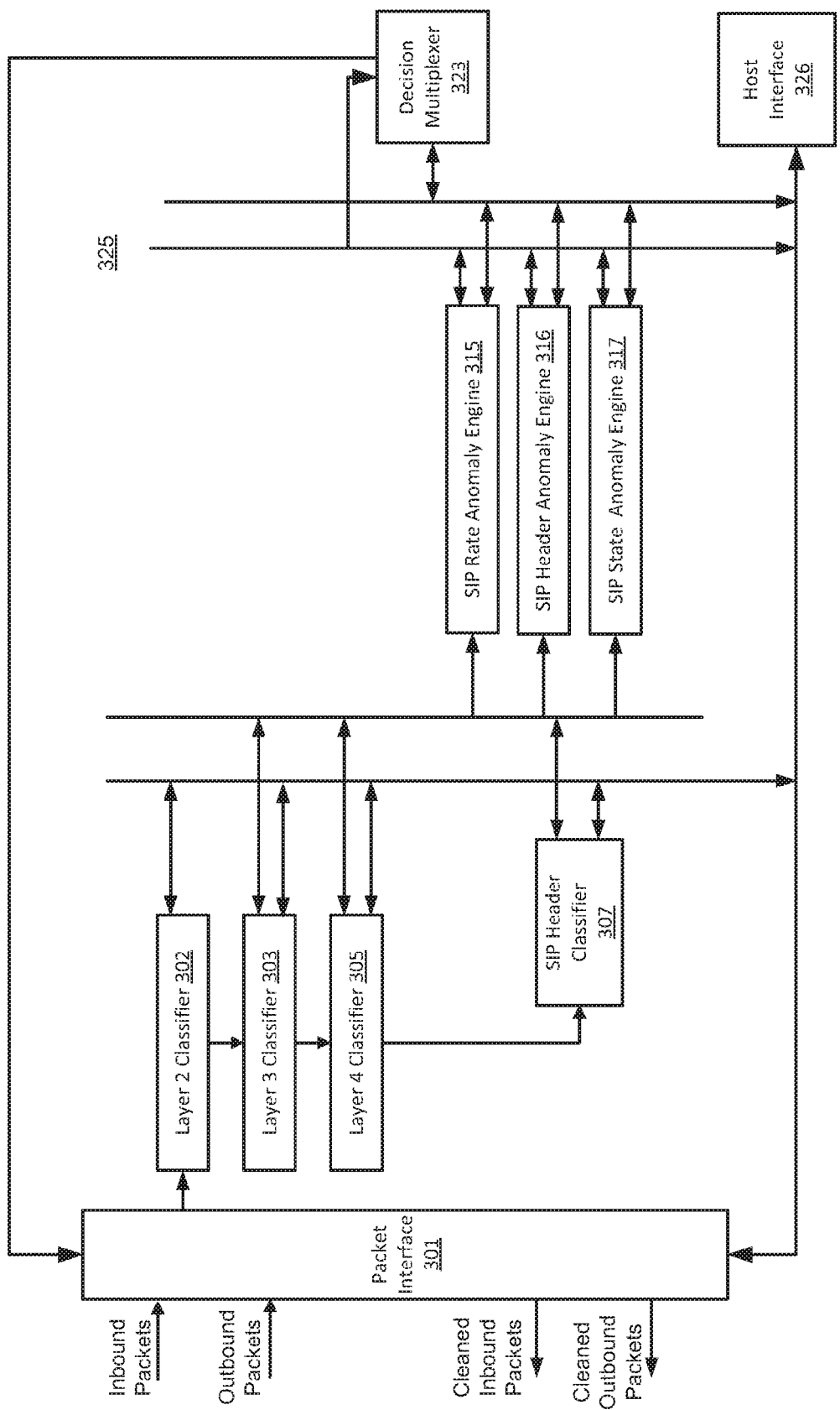
FIG. 3 illustrates further details of the specific implementation of session initiation protocol and related components in accordance with an embodiment of the present invention.

FIG. 3 further illustrates the details for Layer 7 classifier using exemplary SIP Classifier 307 in accordance with an embodiment of the present invention. It similarly illustrates further details of the layer 7 rate anomaly meters 215, Layer 7 Anomaly Engine 216 and Layer 7 State Anomaly Engine 217.

In an exemplary embodiment, the SIP classifier 307 classifies all SIP packets over TCP or UDP by parsing them in detail. The SIP Classifier 307 identifies TCP/UDP SIP packets based on destination port, it classifies them into SIP requests and responses.

In an exemplary embodiment, the SIP Rate Anomaly Meter 315 detects rate anomalies for the following SIP packets:
- Register Flood,
- Invite Flood,
- Cancel Flood,
- Bye Flood, and
- Additional Flood The rate anomaly determination is done using continuous learning of rates which are passed to the host through the Host Interface 325. The host sets adaptive thresholds for the above floods.

The SIP Header Anomaly Engine 316 takes classified data from the SIP Classifier 307 and determines well-known anomalies such as following:
- CSeq number greater than $2^{31}$
- CSeq header method not matching with method name in request line
- Max-Forward header value greater than 70
- SIP method not matching with any of the specified methods These are further described below with reference to FIG. 5.

SIP State Anomaly Engine 317 takes classified data from the SIP Classifier 307 and maintains stateful transitions. For example, ACK/CANCEL/BYE packets with no corresponding entry in SIP table can be dropped. Another example would be that the CSeq number has to be the same for ACK/CANCEL packets corresponding to the INVITE request. Thus the ACK/CANCEL packets with the CSeq number mismatch can be dropped even though all the other session parameters match. This ensures prevention of spurious messages from reaching the protected server.

Other blocks in FIG. 3, such as Packet Interface 301, Layer 2 Classifier 302, Layer 3 Classifier 303, Layer 4 Classifier 305, Decision Multiplexer 323 and Host Interface 326, may be the same as the counterparts described with reference to FIG. 2.

Figure 4:
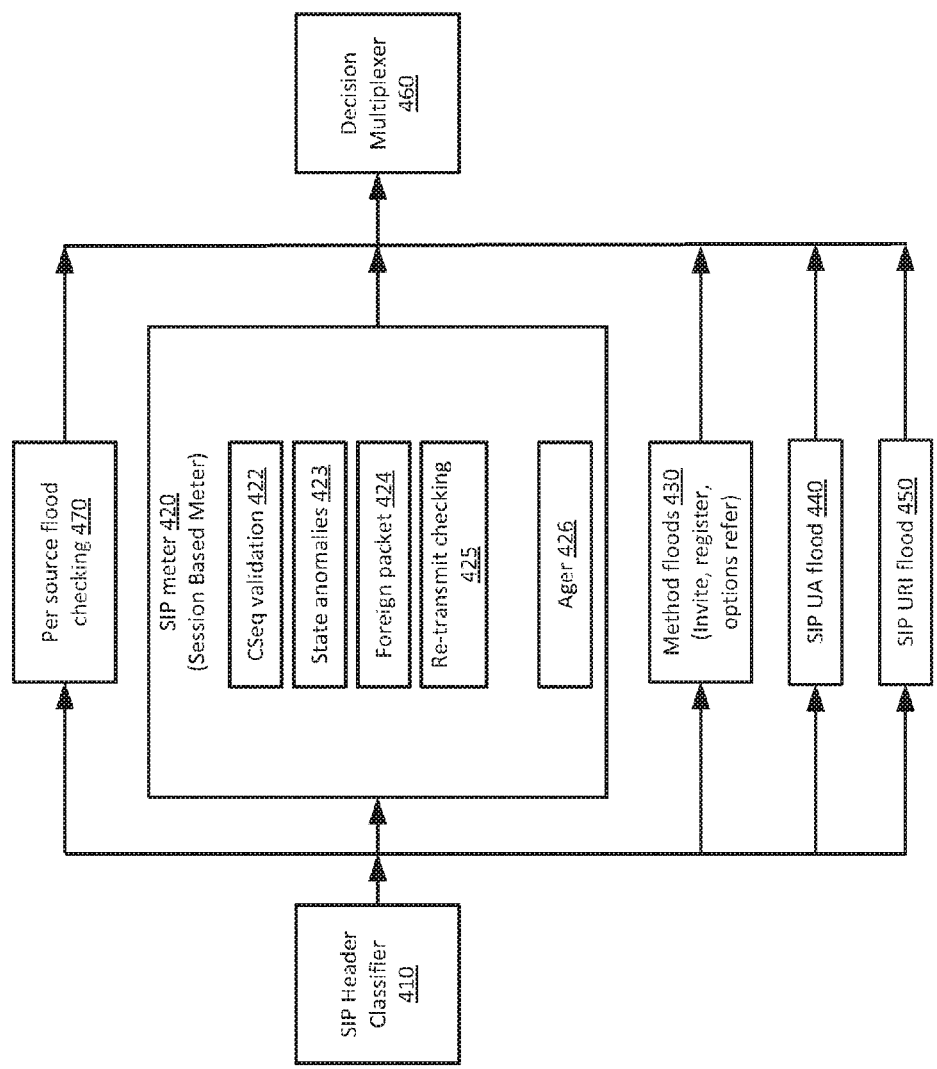
FIG. 4 illustrates a block diagram of the SIP engine in accordance with an embodiment of the present invention.

FIG. 4 further illustrates the details for SIP header, rate and state anomaly engine in accordance with an embodiment of the present invention. In one embodiment, the engine comprises a per source flood checking module 470, a SIP meter 420, a method floods module 430, a SIP User-agent flood module 440, a SIP URI flood module 450. The engine receives header information from SIP header classifier 410 and passes decisions made by individual modules of the engine through the Decision Bus to Decision Multiplexer 460.

In this example, SIP meter 420 is configured to check any anomalies in the SIP packets. SIP meter 420 further comprises a CSeq validation module 422, a state anomalies module 423, a foreign packet module 424, a re-transmit checking 425 and an ager 426. CSeq validation module 422 is configured to check if a Command Sequence (CSeq) in a SIP request is an integer and is incremented for each new request within a dialog. State anomalies module 423 is configured to check if any state anomalies existing in the SIP request. State anomalies module 423 will be further described in greater detail with reference to FIG. 6. Foreign packet module 424 is configured to block packets which outside of a known SIP session. Re-transmit checking module 425 is configured to check retransmissions within a SIP session. The Ager 426 is capable of performing a timer-based aging of the memory tables. This is further described with reference to FIG. 19.

Per source flood checking module 470 can be configured to check the number of requests from the same source IP address. When the number exceeds a predetermined threshold that source can be blocked as an attacker.

Method floods module 430 can be configured to check the numbers of individual types of requests. When the number of one type of requests exceeds a predetermined threshold, method floods module 430 decides that a method-flood has occurred and that any source IP sending packets with this method can be determined to be a potential attacker. Through Source Tracking mechanism, those IPs that send a plurality of such packets with methods under attack can be isolated and blocked.

SIP UA flood module 440 can be configured to check the number of user-agent header in INVITE requests. When the number of user-agent header in INVITE requests exceeds a predetermined threshold, SIP UA flood module 430 decides that a SIP UA flood occurred. Any source IP sending packets with this method can be determined to be a potential attacker. Through Source Tracking mechanism, those IPs that send a plurality of such packets with methods under attack can be isolated and blocked.

SIP URI flood module 450 can be configured to check the number of SIP URI in INVITE requests. When the number of SIP URI in INVITE requests exceeds a predetermined threshold, SIP URI flood module 440 decides that a SIP URI flood has occurred and that any source IP sending packets with this method can be determined to be a potential attacker. Through Source Tracking mechanism, those IPs that send a plurality of such packets with methods under attack can be isolated and blocked.

Figure 5:
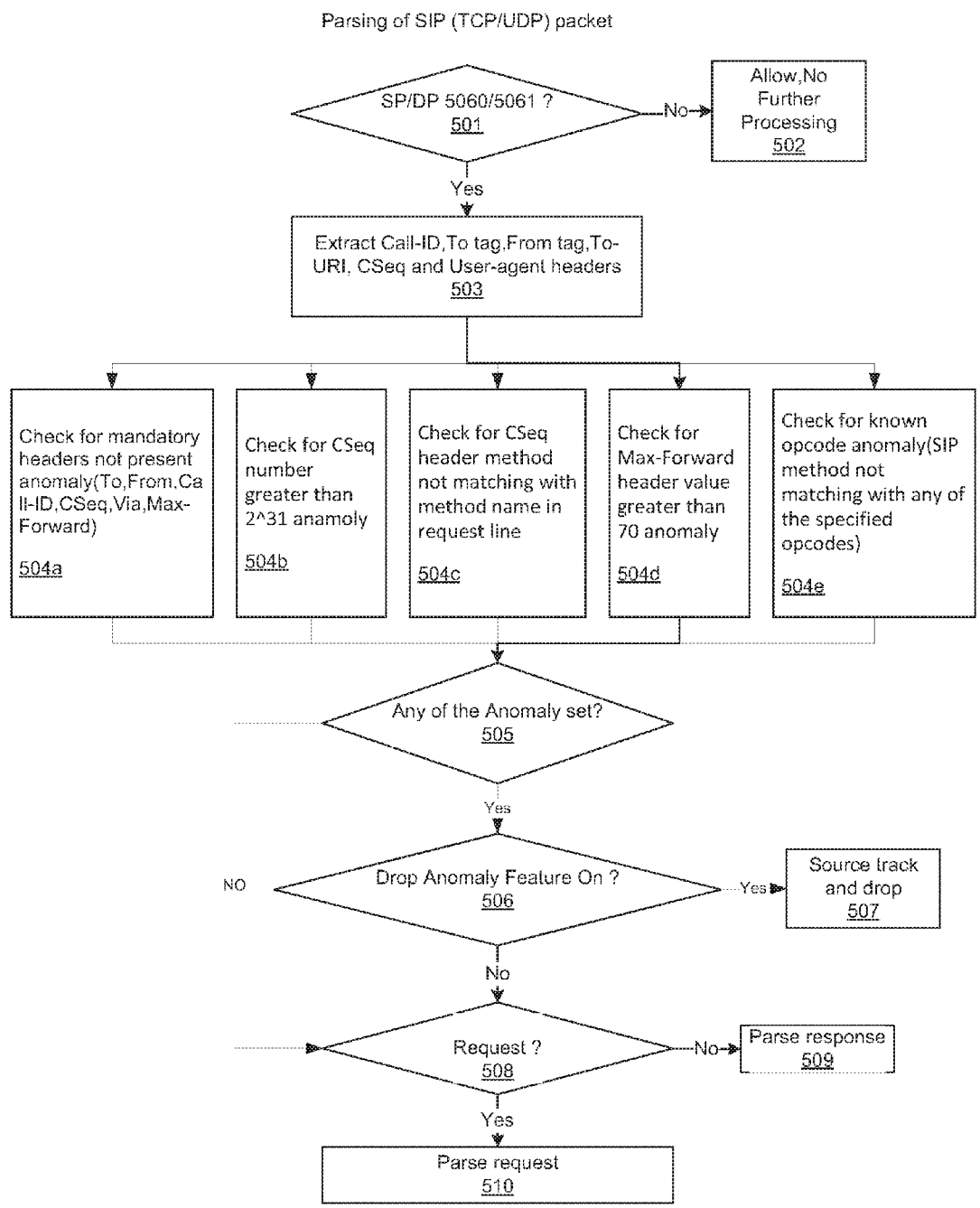
FIG. 5 illustrates parts of logic for classification of SIP packets over TCP and UDP within SIP Classifier in FIG. 3.

FIG. 5 further illustrates the details of SIP Classifier 307 in accordance with an embodiment of the present invention. FIG. 5 illustrates how SIP packets over UDP/TCP are parsed.

At step 501, If a SIP packet has a source or destination port equal to 5060 or 5061, it is considered for further parsing. Based on the positions, at step 503, CALL-ID, To tag, From tag, To-URI, CSeq, user-agent header and etc. are extracted per RFC. If it is not a SIP packet, the packet is allowed and no further SIP processing is required at step 502.

Next, the extracted parameters are checked to see any anomalies exist. At step 504a, the SIP header classifier checks for mandatory headers not present anomaly, such as To, From, CALL-ID, CSeq, Via and Max-Forward parameters in the mandatory header are accord with RFC. At step 504b, the SIP header classifier checks CSeq number anomaly, such as if it is greater than $2^{31}$. At step 504c, the SIP header classifier checks for CSeq header method not matching with method name in request line. At step 504d, the SIP header classifier checks for Max-Forward header value greater than 70 anomalies. At step 504e, the SIP header classifier checks for known opcode anomaly (SIP method not matching with any of the specified opcodes). At step 505, the SIP header classifier checks any of the anomalies exists. If yes, the SIP header classifier checks if drop anomaly feature is set to ON at step 506. If yes, the packet is source tracked and dropped at step 507. If decisions of steps 505 and 506 are no, the SIP packet is further checked to see if it is a SIP request at step 508. If yes, the SIP request is parsed at step 510. If no, the packet is a SIP response, and the SIP response is further parsed at step 509. This is further illustrated in FIGS. 7-18.

Figure 6:
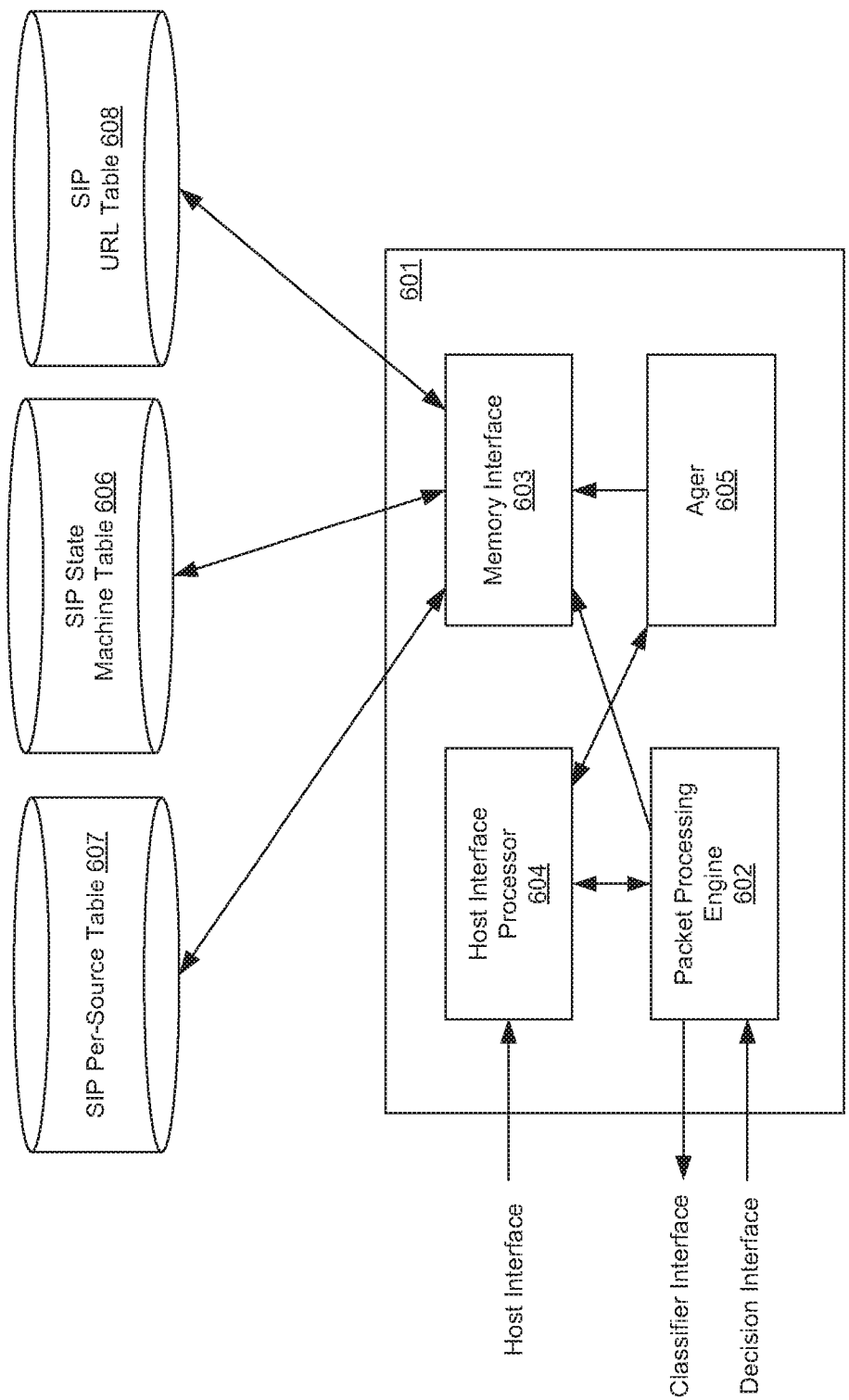
FIG. 6 illustrates a block diagram of components of the SIP Engine implementation in hardware logic in accordance of an embodiment of the present invention.

FIG. 6 further illustrates the integrated details of SIP State Processing Engine of FIG. 3 in accordance with an embodiment of the present invention.

SIP State Anomaly Engine 601 consists of a Packet Processing Engine 602, a Memory Interface 603, a Host Interface Processor 604, an Ager 605, and three memory based tables viz. State Machine Table 606, SIP Source Tracking Table 607, and SIP URI Table 608.

The Packet Processing Engine 602 interfaces with Classifiers including the SIP Classifier on one end and the Decision Multiplexer 322 on the other end. It decides whether a given packet should be allowed or dropped based on state of the system and several other factors discussed below.

The Memory Interface 603 allows controlled, shared and prioritized access to a high speed memory to the Packet Processing Engine 602, the Host Interface Processor 604, and the Ager 605.

The Host Interface Processor 604 allows the controlling host to control the parameters within the Packet Processing Engine 602, and read the statistics as well as initialize and manage the memory tables 606, 607, and 608.

The Ager 605 is capable of performing a timer-based aging of the memory tables 606, 607, and 608. This is further described below.

Table 1 describes the memory table 606 in accordance with an embodiment of the present invention.

TABLE 1

SIP State Machine Table

| Name | Width in bits | Description |
| --- | --- | --- |
| Fwd CSeq | 40 | Forward CSeq |
| RW CSeq | 40 | Reverse CSeq |
| Call ID | 32 | Call ID |
| Fwd Tag | 32 | Forward Tag |
| RW Tag | 32 | Reverse Tag |
| FSM State | 32 | Finite session Machine |
| Collision Pointer | 20 | Collision Pointer |

Table 2 (below) describes the memory table 607 in accordance with an embodiment of the present invention.

TABLE 2

SIP Per-Source flood data structure

| SNo | Name of the field | Width |
|---|---|---|
| 1. | Flags<br>(use bit, col ptr vld, ip type, invite/src block flag, register/src block flag, direction, proxy ip flag) | 7 |
| 2. | VID | 3 |
| 3. | Collision pointer | 20 |
| 4. | Source IP address | 128 |
| 5. | Entry timeout | 16 |
| 6. | Concurrent INVITE per source count | 12 |
| 7. | SIP REGISTER per source count | 12 |
| 8. | SIP INVITE per source count | 12 |
| 9. | Flood flags<br>(invite/src flood flag, concurrent invite/src flood flag, register/src flood flag) | 3 |

Table 3 (below) describes the memory table 608 in accordance with an embodiment of the present invention.

TABLE 3

SIP URL flood data structure

| SNo | Name of the field | Width |
|---|---|---|
| 1. | Packet count in Outbound direction | 31 |
| 2. | Threshold in Outbound direction | 31 |
| 3. | Accumulated Drop count in Outbound direction | 23 |
| 4. | Flags in Outbound direction<br>(Zero sectick entry timeout flag, Use bit, Block flag, Deny flag) | 4 |
| 5. | Entry Timeout in Outbound direction | 4 |
| 6. | Max packet count in Outbound direction | 30 |
| 7. | Packet count in Inbound direction | 31 |
| 8. | Threshold in Inbound direction | 31 |
| 9. | Accumulated Drop count in Inbound direction | 23 |
| 10. | Flags in Inbound direction<br>(Zero sectick entry timeout flag, Use bit, Block flag, Deny flag) | 4 |
| 11. | Entry Timeout in Inbound direction | 4 |
| 12. | Max packet count in Inbound direction | 30 |

Preferably, all three tables are implemented using hashed indexes and collision pointers. Those skilled in the art can easily appreciate such implementations. Therefore, they are not further described herein in details.

The Ager 605 comprises a background process that runs every second. The background process periodically reads the above three tables. For every entry, it compares the time-out value with a free running second tick counter. If the time is out, the entry is deleted. This ensures that stale entries do not remain in the table. In some embodiments, the Ager 605 also collects statistics related to entries in the tables and sends them to host through the Host Interface Processor 604. Operations of ager 605 will be described in detail with reference to FIG. 19.

Figure 7:
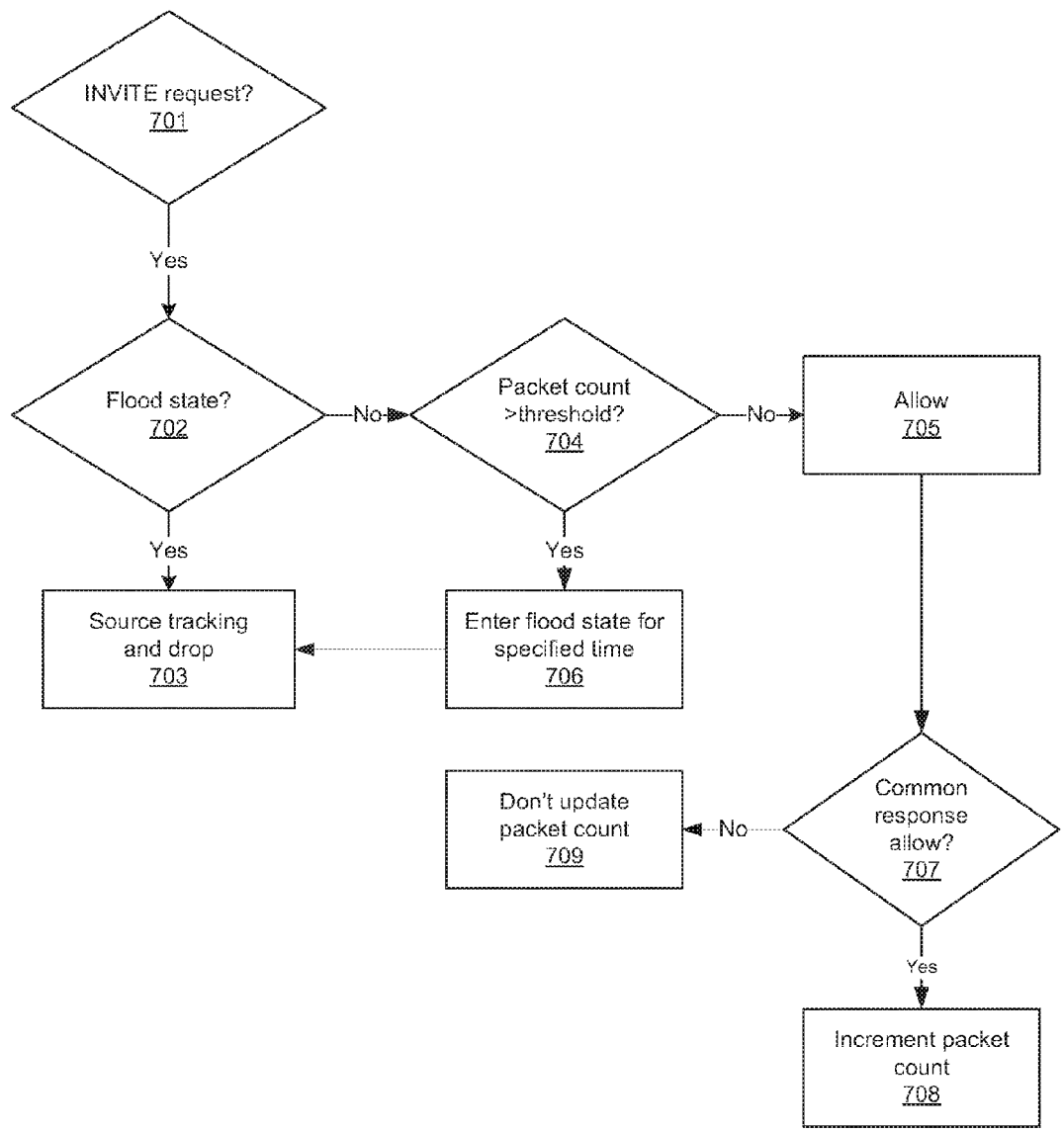
FIG. 7 illustrates parts of logic for processing of INVITE request during normal and rate-flood situations in accordance with an embodiment of the present invention.

FIG. 7 illustrates the details of processing of INVITE request in accordance with an embodiment of the present invention. At step 701, a SIP request is checked to see if it is an INVITE request. If it is indeed an INVITE request, at step 702, flood state is checked. If the flood state is ON, then at step 703, the INVITE source request is tracked. This ensures that same set of sources do not cause this INVITE flood and dropped to stop flood attack. If flood state is not ON at step 702, an invite packet count is compared with a threshold at step 704. If the invite packet count exceeds the threshold, the flood state is set to ON for a specified time period at step 706 and the request is source tracked and dropped at step 703. If the INVITE request count does not exceed the threshold at step 704, the request is allowed at step 705. If common response is allowed at step 707, the invite packet count is incremented at step 708. Otherwise, the invite packet count is not updated at step 709.

Figure 8:
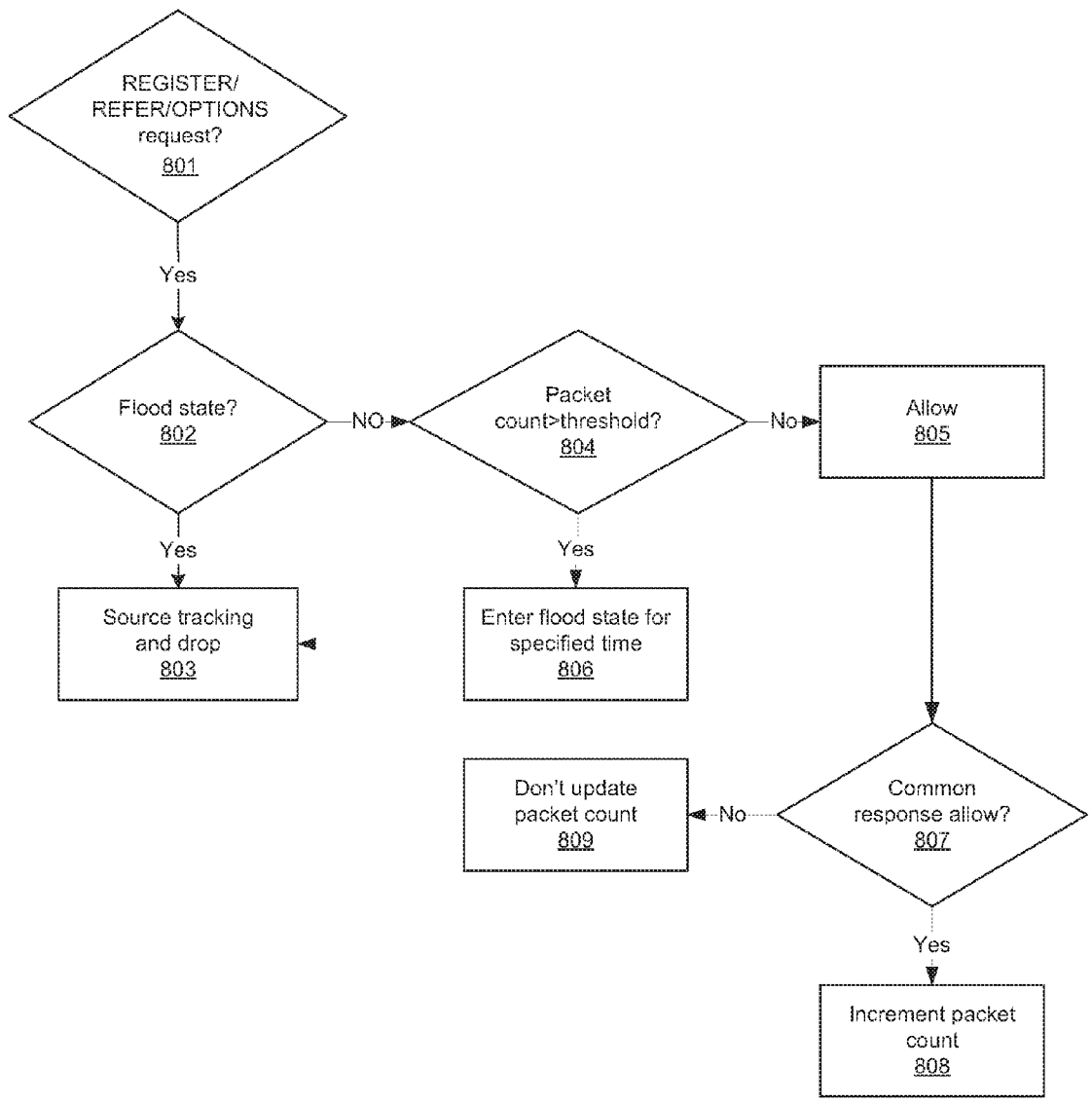
FIG. 8 illustrates parts of logic for processing of SIP requests other than INVITE requests such as Register, Refer and Option requests during normal and rate-flood situations in accordance with an embodiment of the present invention.

FIG. 8 illustrates the details of processing of non-INVITE requests in accordance with an embodiment of the present invention. At step 801, a SIP request is check to see if it is a REGISTER, REFER or OPTONS request. If yes, at step 802, flood state is checked. If the flood state is ON, then at step 803, the non-Invite request is source tracked and dropped to stop flood attack. If flood state is not ON at step 802, a corresponding packet count is compared with a threshold at step 804. If the corresponding packet count exceeds the threshold, the flood state is set to ON for a specified time at step 806 and the request is source tracked and dropped at step 803. If the corresponding request count does not exceed the threshold at step 804, the request is allowed at step 805. Next, if common response is allowed at step 807, the corresponding packet count is incremented at step 808. Otherwise, the corresponding packet count is not updated at step 809.

Figure 9:
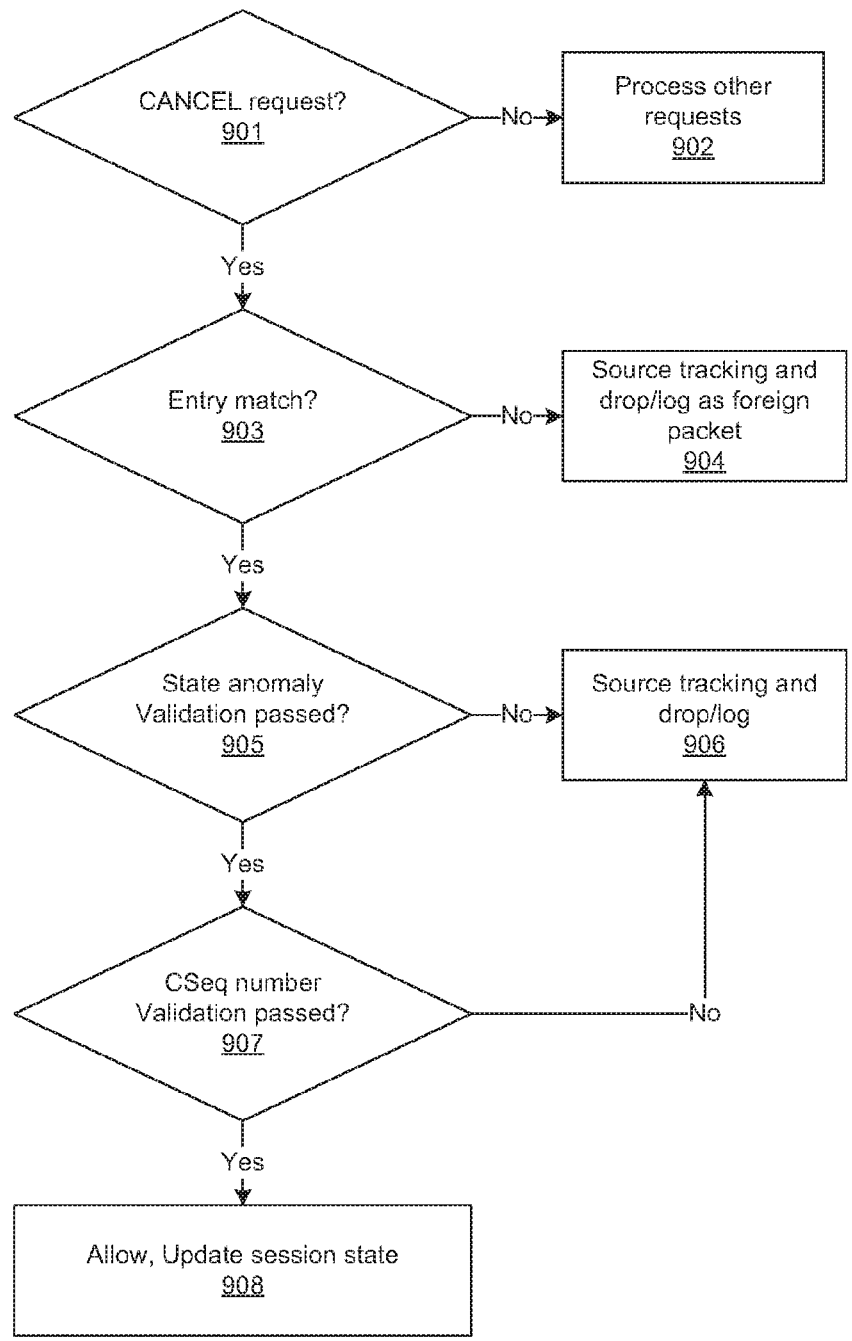
FIG. 9 illustrates parts of logic for processing of SIP CANCEL request during normal and rate-flood situations in accordance with an embodiment of the present invention.

FIG. 9 illustrates the details of processing of SIP CANCEL request in accordance with an embodiment of the present invention. At step 901, a SIP request is check to see if it is a CANCEL request. If not, at step 902, other requests are processed. If the request is a CANCEL request, the CANCEL request is matched with entries in the SIP Source Tracking Table 607 at step 903. If there is no match, the request is source tracked and dropped as foreign packet at step 904. If the CANCEL request is matched in step 903, then at step 905, the state of the CANCEL request is checked by the state anomalies module according to the SIP State Machine Table 606. If the state anomaly validation is not passed, the request is source tracked and dropped at step 906. If the state anomaly validation is passed, then at step 907, the CSeq number of the CANCEL request is checked by the CSeq validation module 422. If the CSeq number validation is not passed, the request is source tracked and dropped at step 906. If the CSeq number validation is passed, the CANCEL request is allowed and a session state is updated accordingly at step 908.

Figure 10:
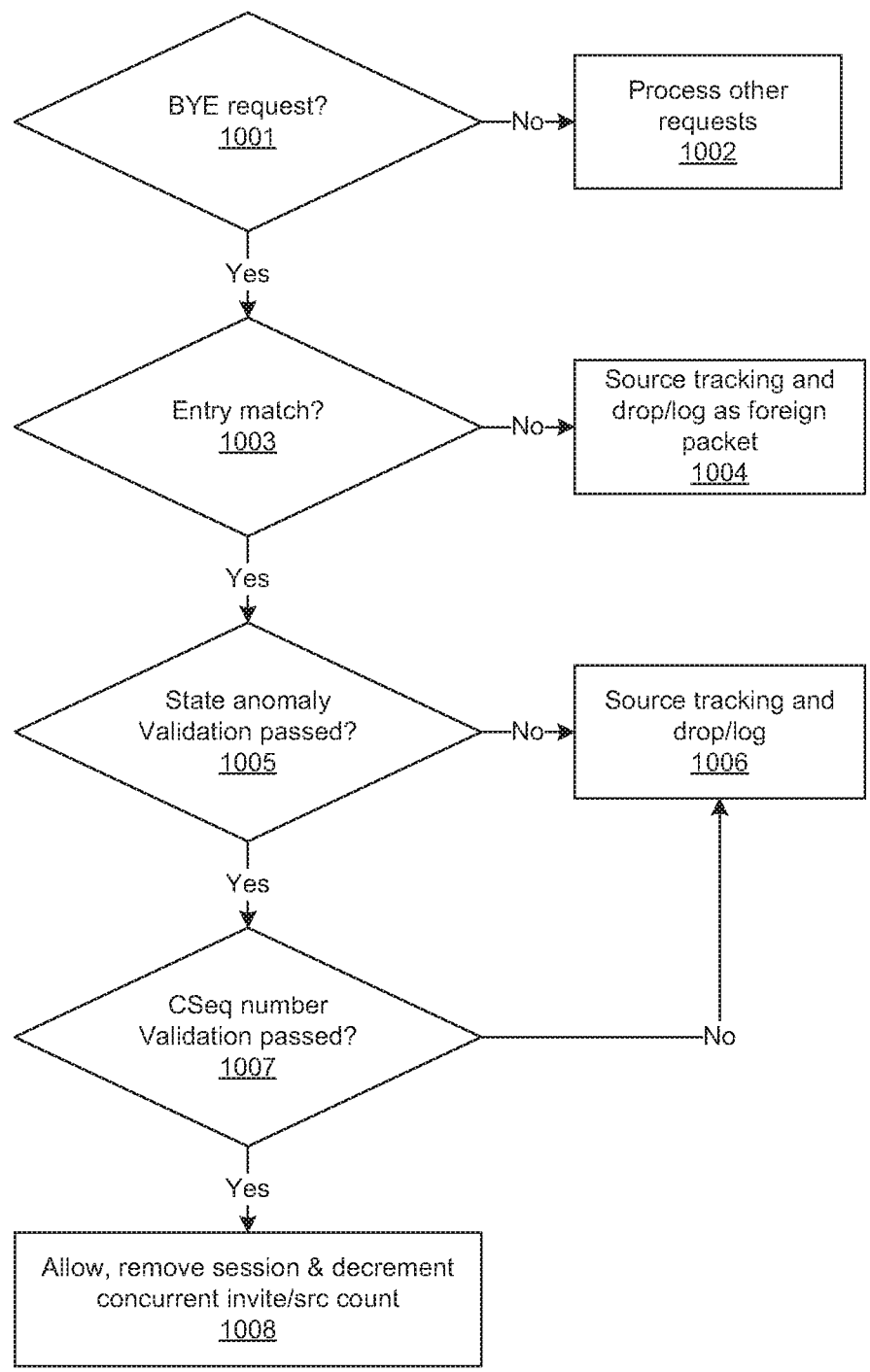
FIG. 10 illustrates parts of logic for processing of SIP BYE request during normal and rate-flood situations in accordance with an embodiment of the present invention.

FIG. 10 illustrates the details of processing of SIP BYE request in accordance with an embodiment of the present invention. At step 1001, a SIP request is check to see if it is a BYE request. If not, at step 1002, other requests are processed. If the request is a BYE request, the BYE request is matched with entries in the SIP Source Tracking Table 607 at step 1003. If there is no match, the request is source tracked and dropped as foreign packet at step 1004. If the BYE request is matched in step 1003, then at step 1005, the state of the BYE request is checked by the state anomalies module according to the SIP State Machine Table 606. If the state anomaly validation is not passed, the request is source tracked and dropped at step 1006. If the state anomaly validation is passed, then at step 1007, the CSeq number of the BYE request is checked by the CSeq validation module 422. If the CSeq number validation is not passed, the request is source tracked and dropped at step 1006. If the CSeq number validation is passed, the BYE request is allowed and a session state is updated accordingly at step 1008.

Figure 11:
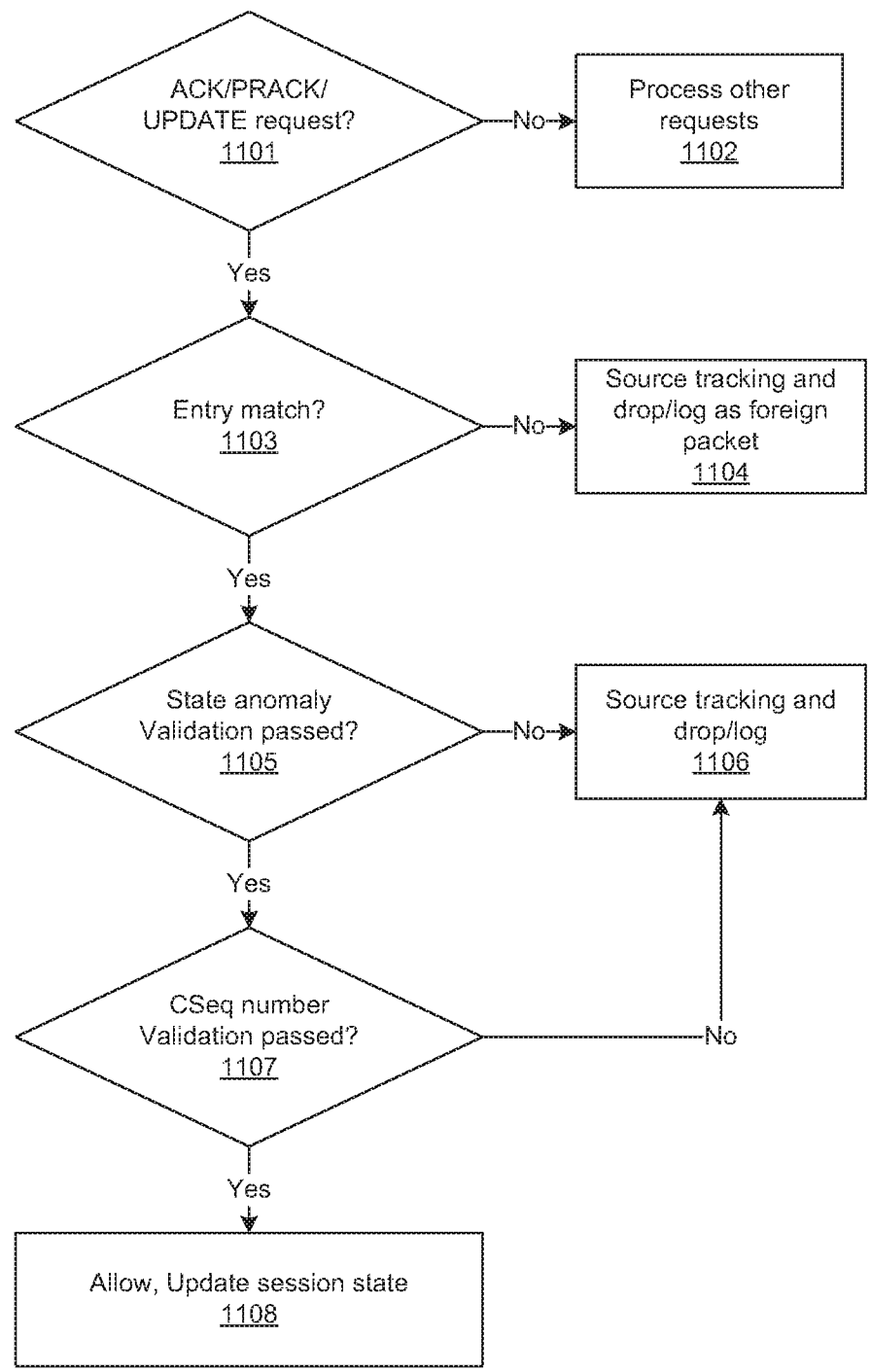
FIG. 11 illustrates parts of logic for processing of other SIP requests such as ACK, PRACK and Update request during normal and rate-flood situations in accordance with an embodiment of the present invention.

FIG. 11 illustrates the details of processing of other requests in accordance with an embodiment of the present invention. At step 1101, a SIP request is check to see if it is an ACK, PRACK or UPDATE request. If not, at step 1102, other requests are processed. If the request is indeed an ACK, PRACK or UPDATE request, the request is matched with corresponding entries in the SIP Source Tracking Table 607 at step 1103. If there is no match, the request is source tracked and dropped as foreign packet at step 1104. If the request is matched in step 1103, then at step 1105, the corresponding state of the request is checked by the state anomalies module according to the SIP State Machine Table 606. If the state anomaly validation is not passed, the request is source tracked and dropped at step 1106. If the state anomaly validation is passed, then at step 1107, the CSeq number of the request is checked by the CSeq validation module 422. If the CSeq number validation is not passed, the request is source tracked and dropped at step 1106. If the CSeq number validation is passed, the request is allowed and a corresponding session state is updated accordingly at step 1108.

Figure 12:
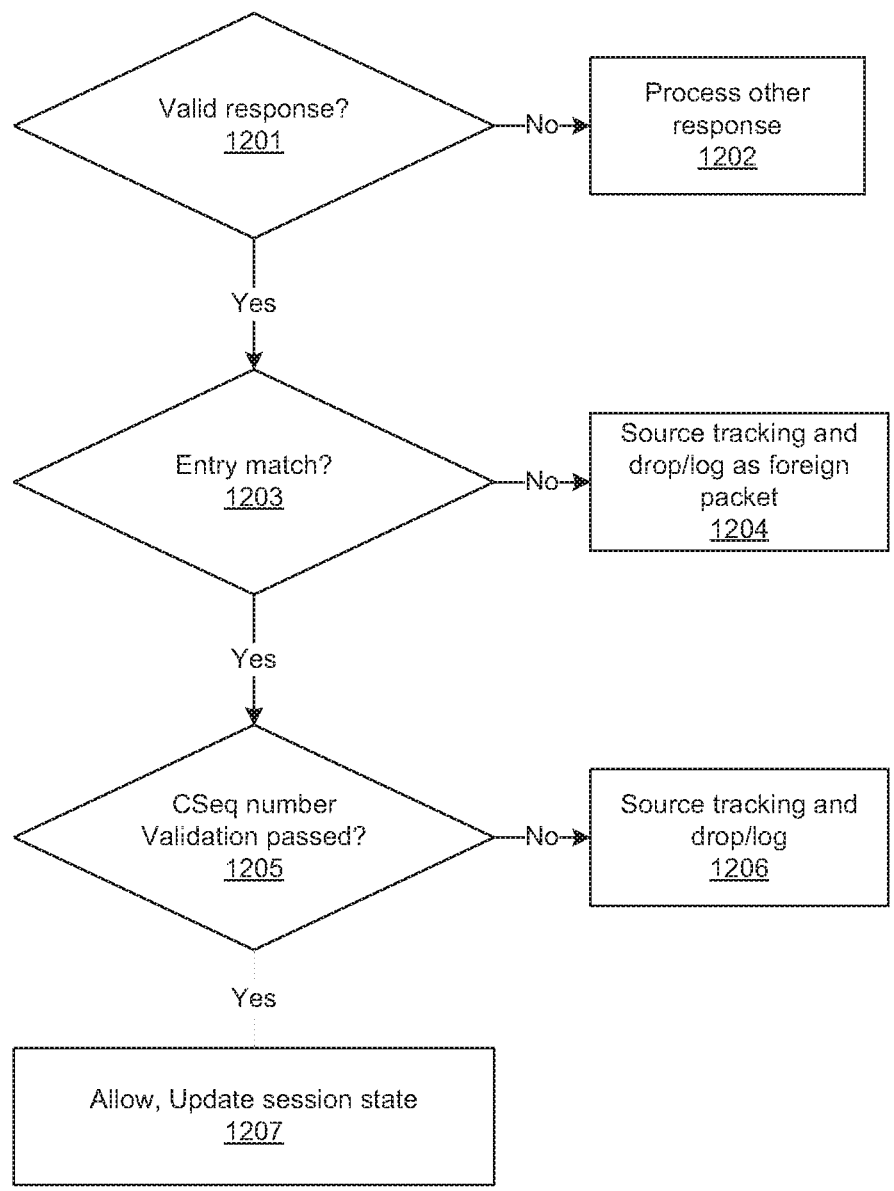
FIG. 12 illustrates parts of logic for processing of response packets during normal and rate-flood situations in accordance with an embodiment of the present invention.

FIG. 12 illustrates the details of processing of SIP response packets in accordance with an embodiment of the present invention. At step 1201, a SIP response is check to see if it is valid response per RFC. If not, at step 1202, other responses are processed. If the response is valid, the response is matched with corresponding entries in the SIP Source Tracking Table 607 at step 1203. If there is no match, the response is source tracked and dropped as foreign packet at step 1204. If the response is matched in step 1203, then at step 1205, the CSeq number of the response is checked by the CSeq validation module 422. If the CSeq number validation is not passed, the response is source tracked and dropped at step 1206. If the CSeq number validation is passed, the response is allowed and a corresponding session state is updated accordingly at step 1207.

Figure 13:
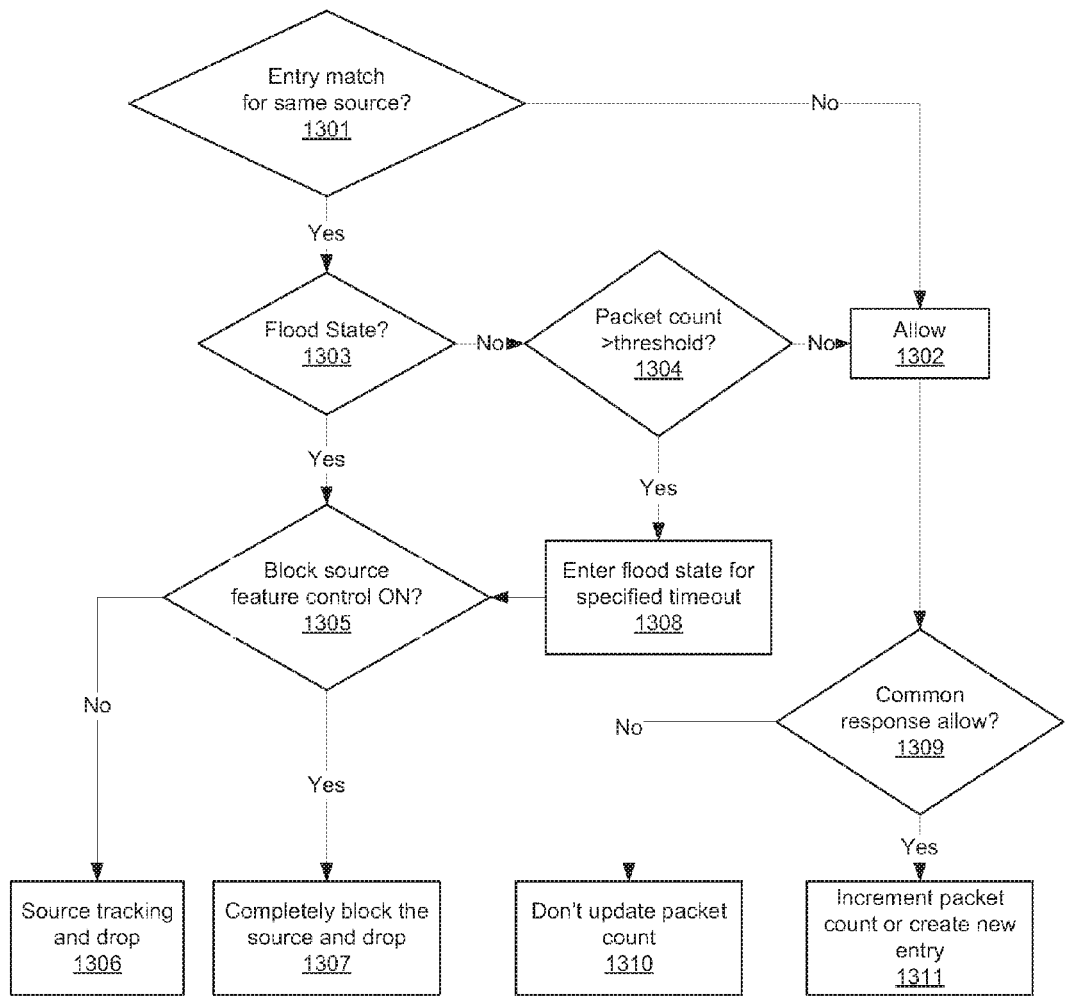
FIG. 13 illustrates parts of logic for processing of SIP INVITE per source flood tracking during normal and rate-flood situations in accordance with an embodiment of the present invention.

FIG. 13 illustrates the details of processing of SIP INVITE per source flood tracking in accordance with an embodiment of the present invention. This ensures that a single IP address doesn't send too many SIP INVITEs in a short duration. At step 1301, a source IP address of an INVITE request is matched with source IP addresses entries in the SIP Source Tracking Table 607. If there is no match, the request is allowed at step 1302. Then if common response is allowed at step 1309, packet count for INVITE request from the source IP address is incremented or a new count is created at step 1311. If common response is not allowed, the packet count is not updated at step 1310. Back to step 1301, if the INVITE request is from the same source IP address, then a flood state is checked at step 1303. If the flood state is ON, a block source feature control is checked at step 1305. If the block source feature control is ON, then the invite request is dropped and INVITE requests from the source IP address is completely blocked at step 1307. If the control is not ON at step 1305, then the INVITE request is source tracked and dropped at step 1306. If the flood state is not ON at step 1303, then a packet count of INVITE request is compared with a threshold at step 1304. If the threshold is not exceeded, the request is allowed at step 1302. If the threshold is exceeded, the flood state is entered for a specified time at step 1308.

Figure 14:
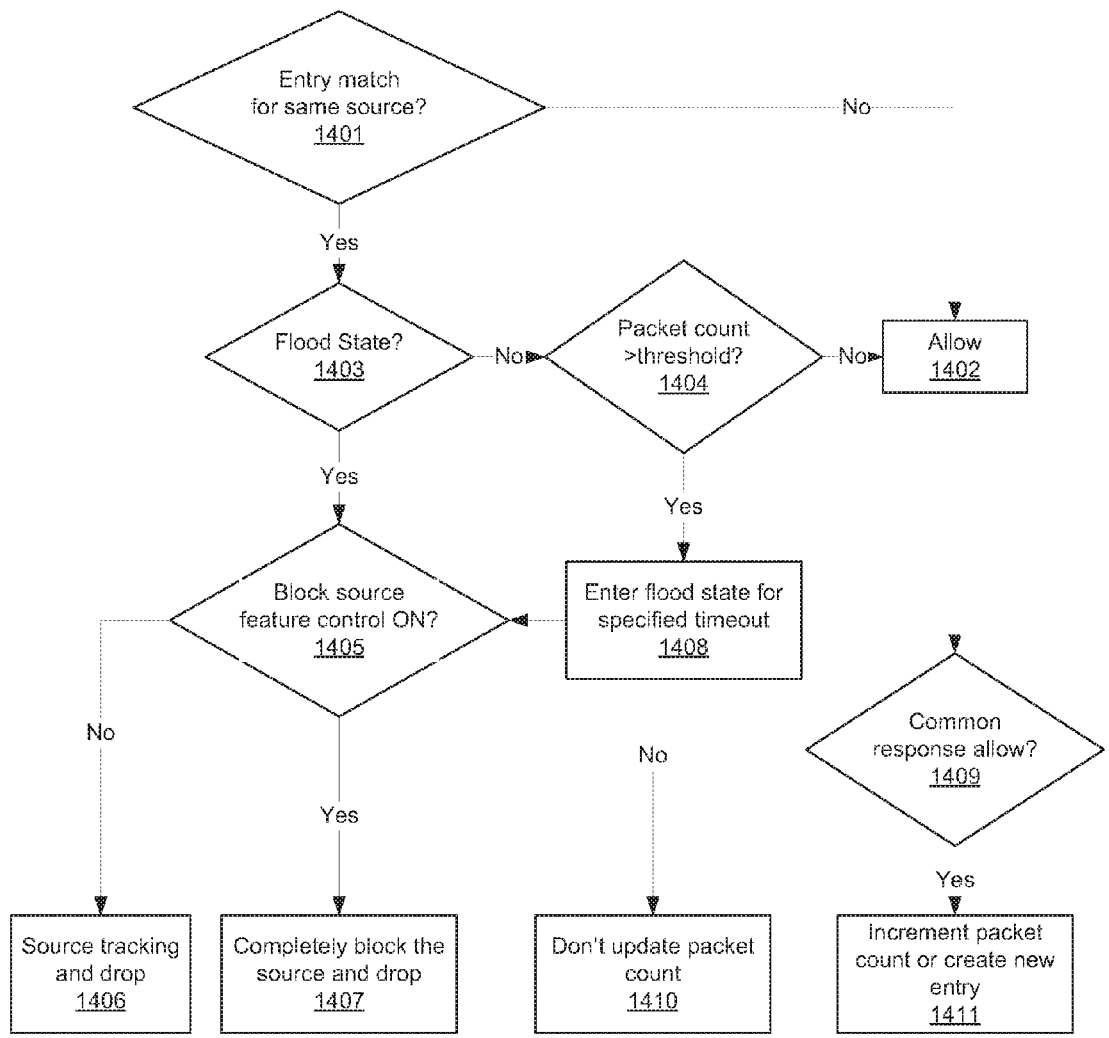
FIG. 14 illustrates parts of logic for processing of SIP REGISTER per source flood tracking during normal and rate-flood situations in accordance with an embodiment of the present invention.

FIG. 14 illustrates the details of processing of REGISTER per source flood tracking in accordance with an embodiment of the present invention. This ensures that a single Source IP doesn't register too many times within a short period. At step 1401, a source IP address of a REGISTER request is matched with source IP addresses entries in the SIP Source Tracking Table 607. If there is no match, the request is allowed at step 1402. Then if common response is allowed at step 1409, packet count for REGISTER request from the source IP address is incremented or a new count is created at step 1411. If common response is not allowed, the packet count is not updated at step 1410. Back to step 1401, if the REGISTER request is from the same source IP address, then a flood state is checked at step 1403. If the flood state is ON, a block source feature control is checked at step 1405. If the block source feature control is ON, then the REGISTER request is dropped and REGISTER requests from the source IP address is completely blocked at step 1407. If the control is not ON at step 1405, then the REGISTER request is source tracked and dropped at step 1406. If the flood state is not ON at step 1403, then a packet count of REGISTER request is compared with a threshold at step 1404. If the threshold is not exceeded, the request is allowed at step 1402. If the threshold is exceeded, the flood state is entered for a specified time at step 1408.

Figure 15:
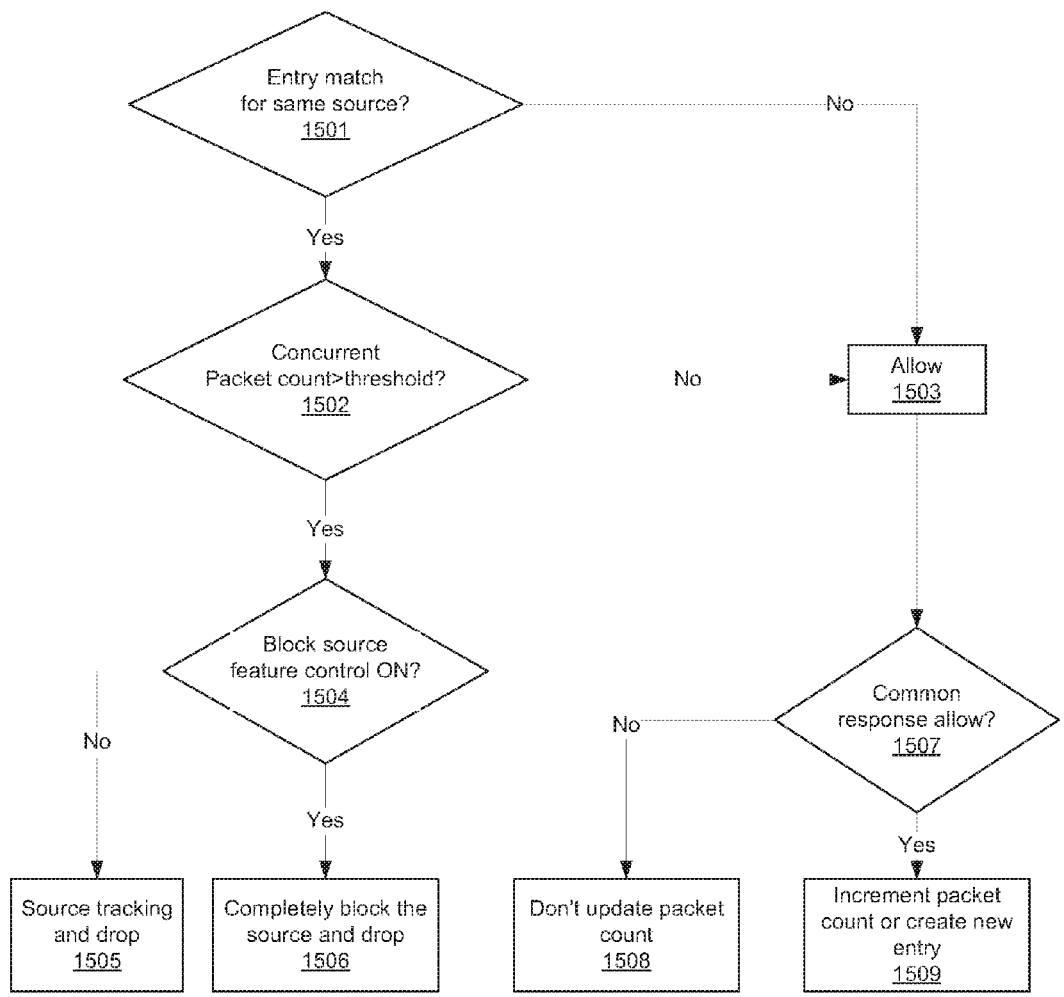
FIG. 15 illustrates parts of logic for processing of SIP concurrent INVITE per source flood tracking during normal and rate-flood situations in accordance with an embodiment of the present invention.

FIG. 15 illustrates the details of processing of concurrent invite per source flood tracking in accordance with an embodiment of the present invention. This ensures that a single source IP address doesn't build too many concurrent SIP connections. At step 1501, a source IP address of an INVITE request is matched with source IP addresses entries in the SIP Source Tracking Table 607. If there is no match, the request is allowed at step 1503. Then if common response is allowed at step 1507, concurrent packet count for INVITE request from the source IP address is incremented or a new count is created at step 1509. If common response is not allowed, the packet count is not updated at step 1508. Back to step 1501, if the INVITE request is from the same source IP address, then a concurrent packet count is compared with a threshold at step 1502. If the threshold is not exceeded, then the INVITE request is allowed at step 1503. If the threshold is exceeded, block source feature control is checked at step 1504. If the control is ON, the INVITE request is dropped and the request from the source IP address is completely blocked. If the control is not ON, the INVITE request is source tracked and dropped at step 1505.

Figure 16:
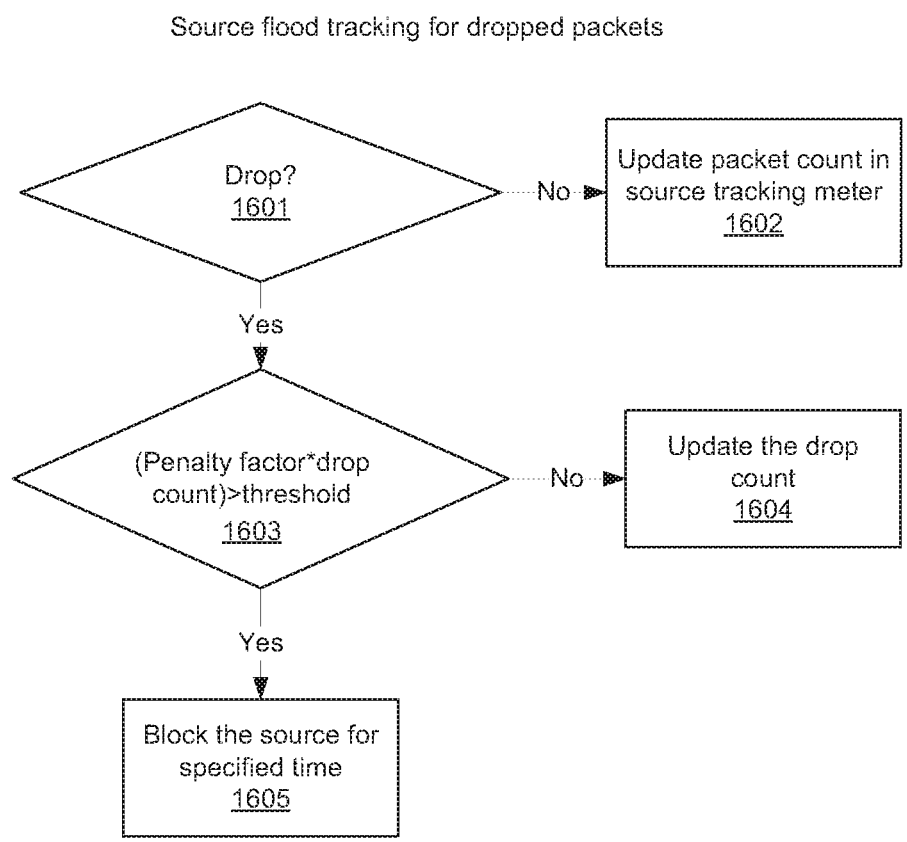
FIG. 16 illustrates parts of logic for processing of source flood tracking for dropped packets during normal and rate-flood situations in accordance with an embodiment of the present invention. This ensures that the same source is caught if it sends too many flood packets of various kinds.

FIG. 16 illustrates the details of processing of source flood tracking for dropped packets in accordance with an embodiment of the present invention. The purpose of this is to ensure that once a specific type of flood has been detected from among a plurality of attacks discussed earlier including SIP INVITE, REGISTER, CANCEL flood etc., if a limited number of sources are responsible for such a flood, they should be specifically and quickly blocked rather than generic operations such as INVITE, REGISTER or CANCEL requests. At step 1601, when a packet arrives, we check if there is an existing flood occurring at the instance. If there is no flood happening, the count for the source is simply incremented by a factor of 1 at step 1602. If there is a flood occurring and the source is sending a packet of that kind, the source's packet rate is incremented by a penalty factor in step 1603. The new count is then compared with a pre-specified threshold in step 1603. If the threshold is not exceeded, then the drop count is updated at step 1604. If the threshold is exceeded, packets for the source IP address is blocked for specified time at step 1605.

Figure 17:
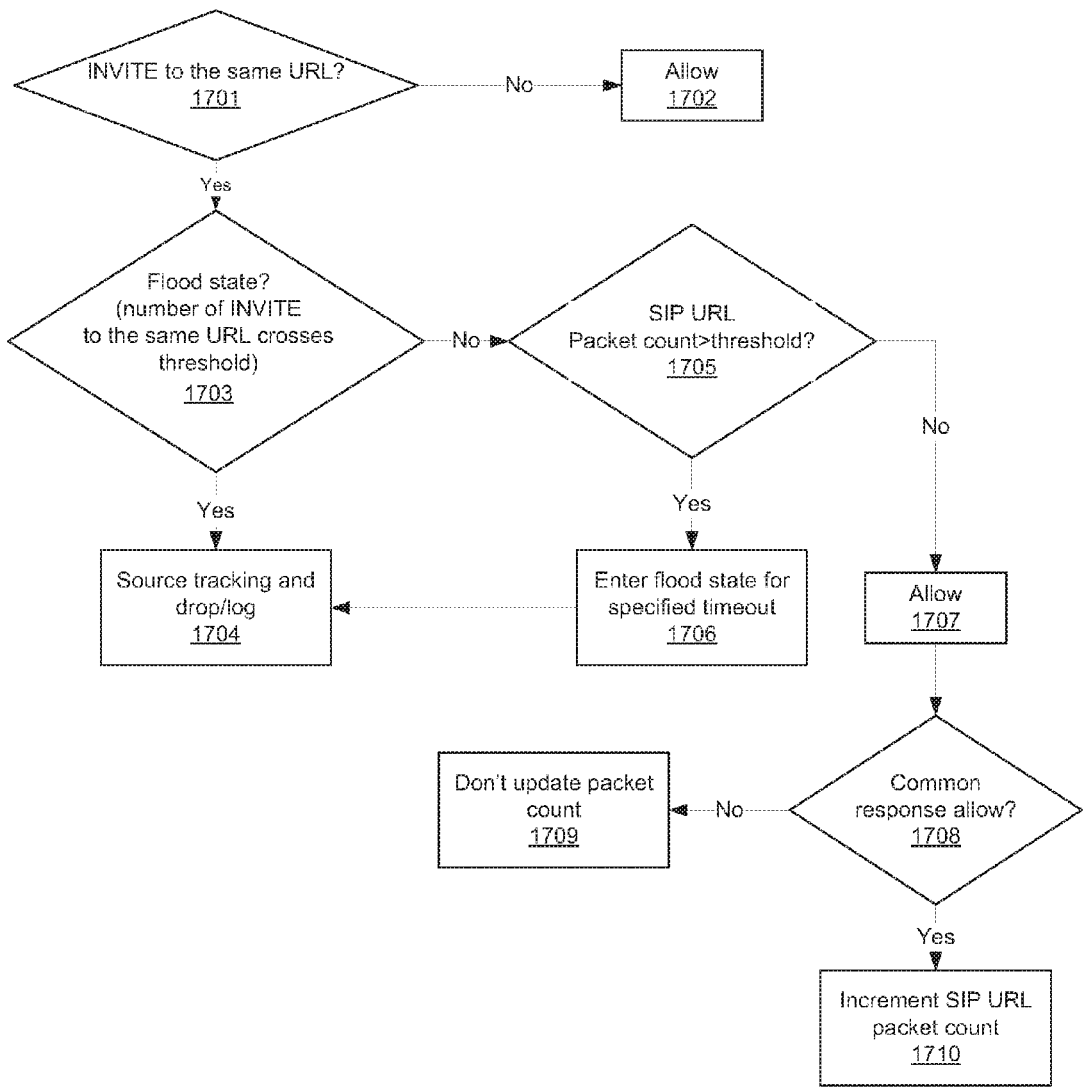
FIG. 17 illustrates parts of logic for processing of SIP URL flood tracking for dropped packets during normal and rate-flood situations in accordance with an embodiment of the present invention. This ensures that a destination is identified as under attack in a multi-destination SIP-URL scenario.

FIG. 17 illustrates the details of processing of SIP URI flood tracking in accordance with an embodiment of the present invention. This ensures that the same SIP URI is not attacked by anyone again and again. Sources that send packet to a specific URI under attack at an instance are multiplicatively punished by a penalty factor to isolate them quickly. This ensures that the URI doesn't remain blocked for long but the sources that send request to the URI are blocked and isolated quickly. At step 1701, a URI in To tag of an INVITE request is matched with entries in the SIP Source Tracking Table 607. If there is no match, the request is allowed at step 1702. If the INVITE request is to the same URI, then a flood state is checked at step 1703. If the flood state is ON, the INVITE request is source tracked and dropped at step 1704. If the flood state is not ON, then a packet count of invite to the same URI is compared with a threshold at step 1705. If the threshold is not exceeded, the request is allowed at step 1707. Then if common response is allowed at step 1708, the packet count for invite to the same URI is incremented or a new count is created at step 1711. If common response is not allowed, the packet count for invite to the same URI is not updated at step 1709. If the packet count exceeds the threshold at step 1705, the flood state is entered for a specified time at step 1706. Then the INVITE request is source tracked and dropped at step 1704.

Figure 18:
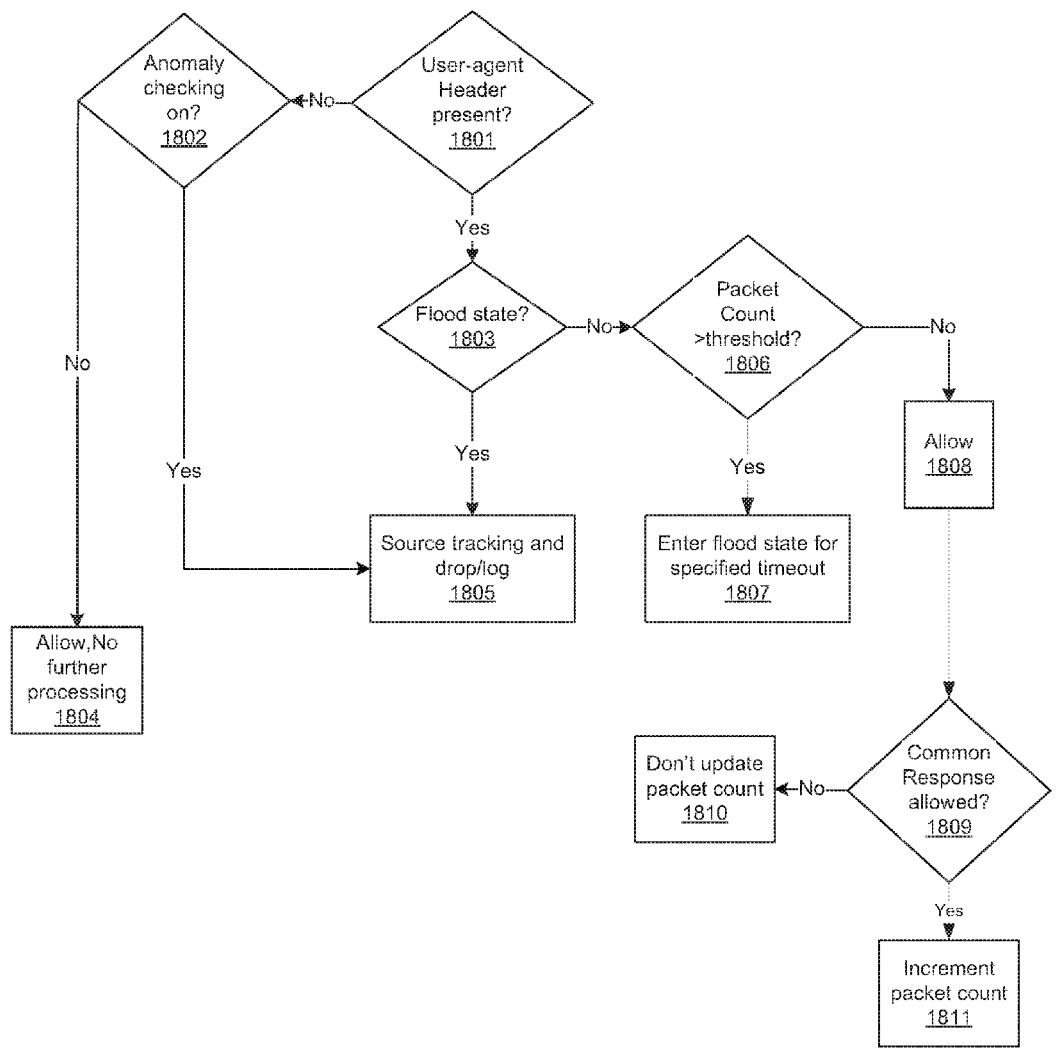
FIG. 18 illustrates parts of logic for processing of INVITE request in SIP user-agent meter during normal and rate-flood situations in accordance with an embodiment of the present invention. The object of this is to identify same user-agent being used from plurality of sources in a multi-source bot flood.

FIG. 18 illustrates the details of processing of SIP user-agent flood tracking in accordance with an embodiment of the present invention. The purpose of this is to isolate SIP user-agents which might be attacking the protected server from a distributed number of user-agents. At step 1801, if a user-agent header presents in an INVITE request is checked. If there is no user-agent header presents in the INVITE request, an anomaly checking state is checked at step 1802. If the anomaly checking is not ON, the INVITE request is allowed and no further processing is needed at step 1804. If the anomaly checking is ON, the INVITE request is source tracked and dropped/logged at step 1805. Back to step 1801, if a user-agent header presents in the INVITE request, a flood state is checked at step 1803. If the flood state is ON, the INVITE request is source tracked and dropped/logged at step 1805. If the flood state is not ON, then a packet count of INVITE requests having user-agent headers is compared with a threshold at step 1806. If the threshold is not exceeded, the request is allowed at step 1808. Then if common response is allowed at step 1809, the packet count for INVITE requests having user-agent headers is incremented or a new count is created at step 1811. If common response is not allowed, the packet count for INVITE requests having user-agent headers is not updated at step 1810. If the packet count exceeds the threshold at step 1806, the flood state is entered for a specified time at step 1807. Then the INVITE request is source tracked and dropped at step 1805.

Figure 19:
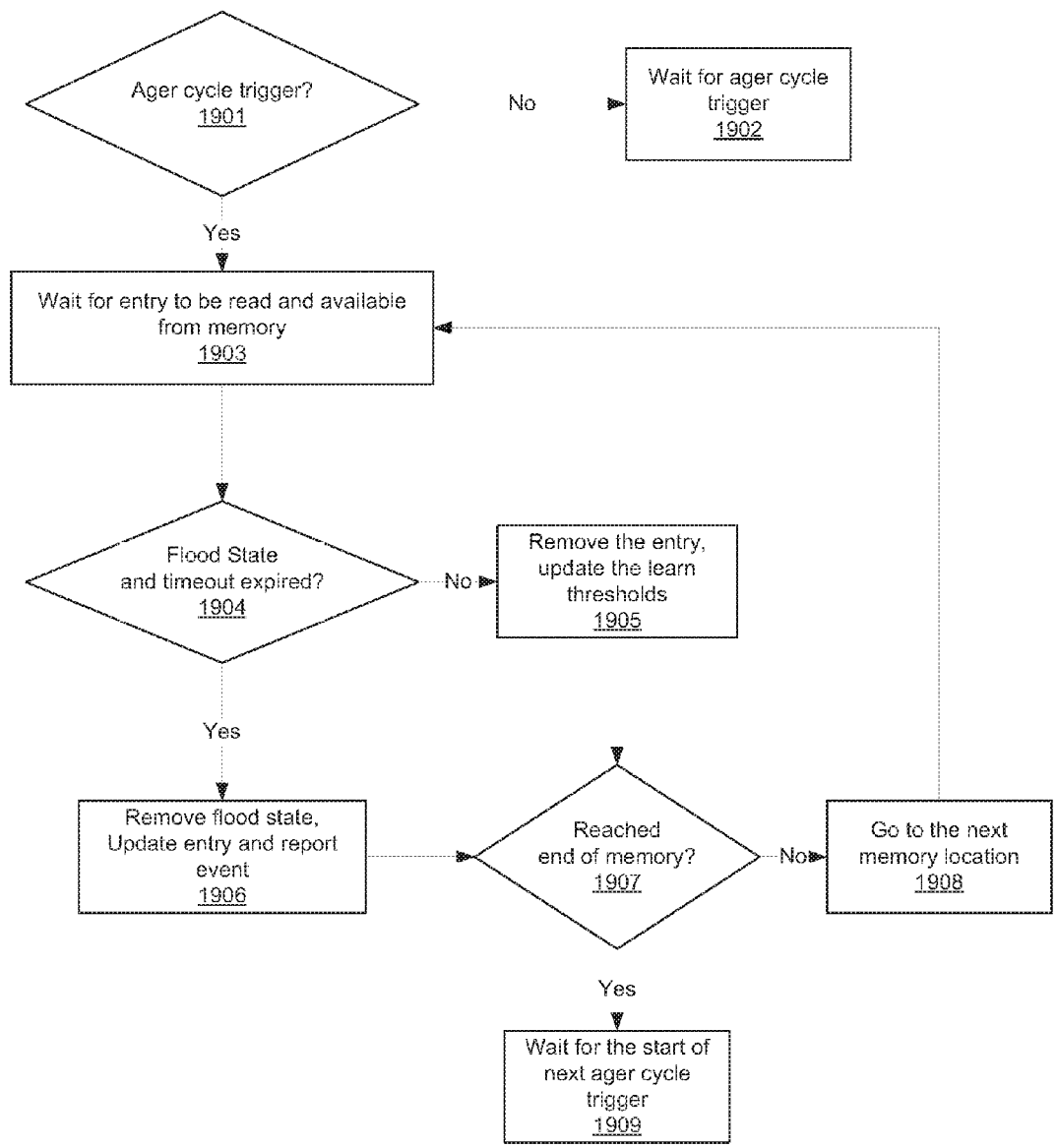
FIG. 19 illustrates further details of the ager mechanism 605 in accordance with an embodiment of the present invention.

FIG. 19 illustrates the details of processing of an ager in accordance with an embodiment of the present invention. At step 1901, an ager cycle trigger is checked. If trigger is not ON, the ager waits for the ager cycle trigger at step 1902. If the trigger is ON, the ager waits for entry to be read and available from memory at step 1903. Then, the ager checks if flood state is ON and timeout is expired at step 1904. If yes, the ager removes flood state, updates entry and reports event at step 1906. Next, the ager checks if end of memory is reached at step 1907. If yes, the ager waits for the start of next ager cycle trigger at step 1909. If end of memory is not reached, the processing goes to the next memory location at step 1908 and ager flow goes back to step 1903 again. Back to step 1904, if flood state is not ON and timeout is not expired, the ager removes the entry, updates the learn thresholds at step 1905. Then, the ager flow goes to step 1907.

Figure 20:
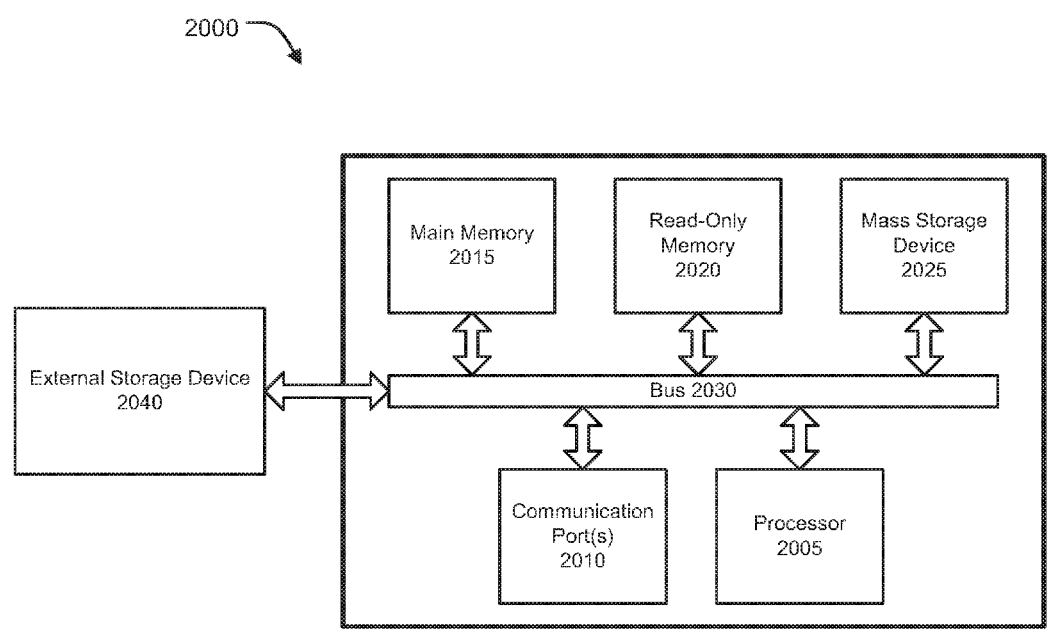
FIG. 20 illustrates an exemplary computer system in which or with which embodiments of the present invention may be utilized.

FIG. 20 is an example of a computer system 2000 with which embodiments of the present disclosure may be utilized. Computer system 2000 may represent or form a part of integrated system 100 for the prevention of network attacks.

Embodiments of the present disclosure include various steps, which will be described in more detail below. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 2000 includes a bus 2030, a processor 2005, communication port 2010, a main memory 2015, a removable storage media 2040, a read only memory 2020 and a mass storage 2025. A person skilled in the art will appreciate that computer system 2000 may include more than one processor and communication ports.

Examples of processor 2005 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 2005 may include various modules associated with monitoring unit as described in FIG. 2. Processor 2005 may include parameter fetching module 220 for fetching parameters shared by other networks.

Communication port 2010 can be any of an RS-232 port for use with a modem based dialup connection, a 10/100 Ethernet port, a Gigabit or 10 Gigabit port using copper or fiber, a serial port, a parallel port, or other existing or future ports. Communication port 2010 may be chosen depending on a network, such a Local Area Network (LAN), Wide Area Network (WAN), or any network to which computer system 2000 connects.

Memory 2015 can be Random Access Memory (RAM), or any other dynamic storage device commonly known in the art. Read only memory 2020 can be any static storage device(s) such as, but not limited to, a Programmable Read Only Memory (PROM) chips for storing static information such as start-up or BIOS instructions for processor 2005.

Mass storage 2025 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 2030 communicatively couples processor(s) 2005 with the other memory, storage and communication blocks. Bus 2030 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 2005 to system memory.

Optionally, operator and administrative interfaces, such as a display, keyboard, and a cursor control device, may also be coupled to bus 2030 to support direct operator interaction with computer system 2000. Other operator and administrative interfaces can be provided through network connections connected through communication port 2010.

Removable storage media 2040 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

The methods described above lead to the reduction of queries and responses reaching the SIP servers and thus advantageously reduce the load on the SIP servers during rate-based floods.

Although embodiments of the present invention and their various advantages have been described in detail, it should be understood that the present invention is not limited to or defined by what is shown or discussed herein.

Moreover, as one skilled in the art will appreciate, any digital computer systems can be configured or otherwise programmed to implement the methods and apparatuses disclosed herein, and to the extent that a particular digital computer system is configured to implement the methods and apparatuses of this invention, it is within the scope and spirit of the present invention. Once a digital computer system is programmed to perform particular functions pursuant to computer-executable instructions from program software that implements the present invention, it in effect becomes a special purpose computer particular to the present invention. The techniques necessary to achieve this are well known to those skilled in the art and thus are not further described herein.

Computer executable instructions implementing the methods and techniques of the present invention can be distributed to users on a computer-readable medium and are often copied onto a hard disk or other storage medium. When such a program of instructions is to be executed, it is usually loaded into the random access memory of the computer, thereby configuring the computer to act in accordance with the techniques disclosed herein. All these operations are well known to those skilled in the art and thus are not further described herein. The term "computer-readable medium" encompasses distribution media, intermediate storage media, execution memory of a computer, and any other medium or device capable of storing for later reading by a computer a computer program implementing the present invention.

Accordingly, drawings, tables, and description disclosed herein illustrate technologies related to the invention, show examples of the invention, and provide examples of using the invention and are not to be construed as limiting the present invention. Known methods, techniques, or systems may be discussed without giving details, so to avoid obscuring the principles of the invention. As it will be appreciated by one of ordinary skill in the art, the present invention can be implemented, modified, or otherwise altered without departing from the principles and spirit of the present invention. Therefore, the scope of the present invention should be determined by the following claims and their legal equivalents.

What is claimed is:

1. A method comprising:
   receiving, by a packet interface of a denial of service (DoS) attack mitigation appliance associated with a private network, inbound/outbound packets; and
   protecting, by the DoS attack mitigation appliance, a Session Initiation Protocol (SIP) server within the private network from being flooded by:
      classifying, by a Session Initiation Protocol (SIP) classifier of the DoS attack mitigation appliance, SIP packets of the inbound/outbound packets as either SIP requests or SIP responses;
      classifying, by a SIP header classifier of the DoS attack mitigation appliance, various components of SIP protocol headers of the SIP requests and the SIP responses;
      identifying, by a per source flood checking module of the DoS attack mitigation appliance, a particular source Internet Protocol (IP) as an attacker by detecting SIP requests from the particular source Internet Protocol (IP) address exceeding a predetermined request threshold;
      identifying, by a method floods module of the DoS attack mitigation appliance, one or more SIP methods under attack by tracking a plurality of individual types of SIP requests observed and for each type of SIP request of the plurality of individual types of SIP requests comparing a number of SIP requests received of the type of SIP request with a corresponding predetermined threshold;
      identifying, by a SIP user-agent (UA) flood module of the DoS attack mitigation appliance, occurrence of a SIP UA flood by comparing a number of UA headers in INVITE requests of the SIP requests to a predetermined UA threshold;
      identifying, by a SIP Uniform Resource Identifier (URI) flood module of the DoS attack mitigation appliance, occurrence of a SIP URI flood by comparing a number of SIP URIs in the INVITE requests to a predetermined URI threshold; and
      during a period in which a particular SIP method is identified as being under attack, dropping, by the DoS attack mitigation appliance, subsequent SIP requests originated by the particular source IP address;
      during a period in which the occurrence of a SIP UA flood has been identified, dropping, by the DoS attack mitigation appliance, subsequent INVITE requests originated by the particular source IP address; and
      during a period in which the occurrence of a SIP URI flood has been identified, dropping, by the DoS attack mitigation appliance, subsequent INVITE requests originated by the particular source IP address.

2. The method of claim 1, further comprising receiving, via a host interface of the DoS attack mitigation appliance, the corresponding predetermined threshold for each type of SIP request of the plurality of individual types of SIP requests, the predetermined UA threshold, the predetermined request threshold and the predetermined URI threshold.

3. The method of claim 1, further comprising determining, by a SIP state anomaly engine of the DoS attack mitigation appliance, existence of layer 2, 3, 4, and 7 header and state anomalies, including one or more of (i) an absence of one or more mandatory headers; (ii) a Command Sequence (CSeq) header in a SIP request exceeding a first predetermined threshold; (iii) a mismatch between a CSeq header method and a method name in a corresponding request line; (iv) a Max-Forward header in the SIP request having a value exceeding a second predetermined threshold; and (v) an opcode anomaly.

4. The method of claim 1, further comprising determining and estimating, by a SIP rate anomaly engine of the DoS mitigation appliance, rate thresholds for parameters of layers 2, 3, 4, and 7.

5. The method of claim 4, further comprising determining rate anomalies for the parameters.

6. The method of claim 1, further comprising determining, by a SIP policy engine, existence of policy violations in the inbound/outbound packets.

7. The method of claim 6, wherein the policy violations involve the inbound/outbound packets containing specific request or response parameters.

8. The method of claim 6, wherein the policy violations involve the inbound/outbound packets containing specific CALL-ID, From tag, To tag, To-URI, CSeq or user-agent header values.

9. The method of claim 1, further comprising inspecting, by a content inspection engine of the DoS mitigation appliance, the SIP requests and the SIP responses for malicious content.

10. The method of claim 9, wherein the content inspection engine identifies existence of content patterns of intrusion in SIP protocol packets.

* * * * *